(12) United States Patent
Yi et al.

(10) Patent No.: US 10,530,167 B2
(45) Date of Patent: Jan. 7, 2020

(54) CIRCUIT FOR CONTROLLING POWER OUTPUT FROM BATTERY PACK AND BATTERY PACK

(71) Applicant: SAMSUNG ELECTRONICS CO., LTD., Suwon-si, Gyeonggi-do (KR)

(72) Inventors: Yong-Seung Yi, Seoul (KR); Du-Hyun Kim, Yongin-si (KR); Hyun-Seok Kim, Suwon-si (KR); Ho-Yeong Lim, Suwon-si (KR); Byeng-Sang Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 34 days.

(21) Appl. No.: 15/820,738

(22) Filed: Nov. 22, 2017

(65) Prior Publication Data

US 2018/0191179 A1 Jul. 5, 2018

(30) Foreign Application Priority Data

Jan. 5, 2017 (KR) .................. 10-2017-0002085

(51) Int. Cl.
*H02J 7/00* (2006.01)
*H01M 10/42* (2006.01)
(Continued)

(52) U.S. Cl.
CPC ......... *H02J 7/0031* (2013.01); *H01M 10/425* (2013.01); *H01M 10/44* (2013.01);
(Continued)

(58) Field of Classification Search
CPC ..... Y02E 60/12; H01M 2/1055; H01M 10/46; H01M 10/425; H02J 7/0045
(Continued)

(56) References Cited

U.S. PATENT DOCUMENTS 5,506,490 A * 4/1996 DeMuro ................ H02J 7/0011
320/106
5,783,998 A * 7/1998 Nakajou ........... H01M 10/4207
340/636.15

(Continued)

FOREIGN PATENT DOCUMENTS

JP 2003-142162 5/2003

OTHER PUBLICATIONS

Extended Search Report dated May 24, 2018 in counterpart European Patent Application No. 17210943.1.

*Primary Examiner* — Arun C Williams
(74) *Attorney, Agent, or Firm* — Nixon & Vanderhye P.C.

(57) ABSTRACT

A portable communication device, according to various embodiments of the present disclosure, may include: a battery pack; a power dissipation element disposed outside the battery pack; a detecting circuit configured to detect the state of the battery pack; and at least one of first switches that are connected to the battery pack and the detecting circuit, wherein the detecting circuit is configured to control at least one of the first switches to: electrically disconnect the power dissipation element from the battery pack when the state of the battery pack does not satisfy a specified condition; and electrically connect the power dissipation element to the battery pack when the state of the battery pack satisfies the specified condition.

20 Claims, 24 Drawing Sheets

(51) Int. Cl.
*H01M 10/44* (2006.01)
*H01M 10/48* (2006.01)

(52) U.S. Cl.
CPC ........... *H01M 10/48* (2013.01); *H02J 7/0029* (2013.01); *H02J 7/0044* (2013.01); *H02J 7/0047* (2013.01); *H02J 7/0063* (2013.01); *H01M 2010/4271* (2013.01); *H01M 2220/30* (2013.01); *H02J 2007/0067* (2013.01)

(58) Field of Classification Search
USPC ....................................................... 320/112
See application file for complete search history.

(56) References Cited

U.S. PATENT DOCUMENTS

| | | |
|---|---|---|
| 5,834,131 A | 11/1998 | Lutz et al. |
| 5,912,544 A | 6/1999 | Miyakawa et al. |
| 5,990,659 A * | 11/1999 | Frannhagen .......... H02J 7/0004 320/106 |
| 8,058,846 B2 | 11/2011 | Kim |
| 8,179,139 B2 | 5/2012 | Kawasumi et al. |
| 2005/0162131 A1* | 7/2005 | Sennami ............. H01M 2/1022 320/128 |
| 2009/0085521 A1 | 4/2009 | Kim |
| 2009/0140696 A1 | 6/2009 | Okuto |
| 2014/0266049 A1 | 9/2014 | Benckenstein, Jr. et al. |
| 2015/0333381 A1 | 11/2015 | Lux et al. |
| 2016/0133996 A1 | 5/2016 | Fukuhara |

\* cited by examiner

CIRCUIT FOR CONTROLLING POWER OUTPUT FROM BATTERY PACK AND BATTERY PACK

CROSS-REFERENCE TO RELATED APPLICATION

This application is based on and claims priority under 35 U.S.C. § 119 to Korean Patent Application Serial No. 10-2017-0002085, which was filed in the Korean Intellectual Property Office on Jan. 5, 2017, the content of which is incorporated by reference herein in its entirety.

TECHNICAL FIELD

The present disclosure relates generally to a circuit for controlling power output from a battery pack, and further relates to a battery pack.

BACKGROUND

A battery cell may be comprised of a positive electrode, a negative electrode, an electrolyte, and a separator, and may perform charging and discharging operations through the movement of lithium ions between the positive electrode and the negative electrode. The separator is used for separating the positive electrode and the negative electrode from each other and for the movement of lithium ions. In the case of a lithium battery, the states of lithium ions may be different between the positive electrode and the negative electrode. Since the states are different, a potential difference may occur between the positive electrode and the negative electrode, so that electrons can move in order to thereby perform a discharging process. Thus, for example, current may flow from an aluminum foil of a positive collector plate to a copper foil of a negative collector plate. The battery pack may be a product including a housing for enclosing a battery cell. The battery pack may be detachably mounted onto the electronic device, or may be enclosed in the electronic device as an integral part of the electronic device, depending on the specification of the electronic device.

In the case where a separator is damaged due to various reasons, such as a separation defect in the manufacturing of the battery or an external impact, an Internal Short Circuit (ISC) may be formed between the positive electrode and the negative electrode so that energy is concentrated on a specific point, which causes burnout of the battery cell. When there is an abnormal reaction, such as a temperature rise, caused by the formation of the ISC inside the battery, the conventional electronic device may stop supplying additional energy to the battery by stopping the charging operation. However, even the above-described operation cannot prevent the burnout of the battery.

SUMMARY

Various example embodiments of the present disclosure address the above-described problems or other problems, and may provide a circuit and a battery pack that can prevent and/or reduce burnout by supplying power from a battery pack to a power dissipation element disposed inside the electronic device when the battery cell enters an abnormal state.

A portable communication device, according to various example embodiments of the present disclosure, may include: a battery pack; a power dissipation element disposed outside the battery pack; a detecting circuit configured to detect the state of the battery pack; and at least one of first switches that are connected to the battery pack and the detecting circuit, wherein the detecting circuit is configured to control at least one of the first switches to: electrically disconnect the power dissipation element from the battery pack when the state of the battery pack does not satisfy a specified condition; and electrically connect the power dissipation element to the battery pack when the state of the battery pack satisfies the specified condition.

An electronic device, according to various example embodiments of the present disclosure, may include: a battery pack; a power management integrated circuit (PMIC) configured to supply power output from the battery pack to the electronic device; a power dissipation element disposed outside the battery pack; and a protecting circuit configured to control the power output from the battery pack, wherein the protecting circuit is configured to: detect the state of the battery pack; electrically disconnect the battery pack from the power dissipation element and electrically connect the battery pack to the power management integrated circuit when the state does not satisfy a specified condition; and electrically connect the battery pack to the power dissipation element and electrically disconnect the battery pack from the power management integrated circuit when the state satisfies the specified condition.

A battery pack, according to various example embodiments of the present disclosure, may include: a housing; a battery cell disposed inside the housing; and one or more switches that are disposed inside the housing, wherein the one or more switches are configured to: electrically connect the battery cell to a power management integrated circuit disposed outside the battery pack and electrically disconnect the battery cell from a power dissipation element disposed outside the battery pack when the state of the battery cell does not satisfy a specified condition; and electrically disconnect the battery cell from the power management integrated circuit and electrically connect the battery cell to the power dissipation element when the state of the battery cell satisfies the specified condition.

Various example embodiments of the present disclosure provide a circuit and a battery pack that can prevent and/or reduce burnout by supplying power from a battery pack to a power dissipation element disposed outside the battery pack when the battery cell enters an abnormal state.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
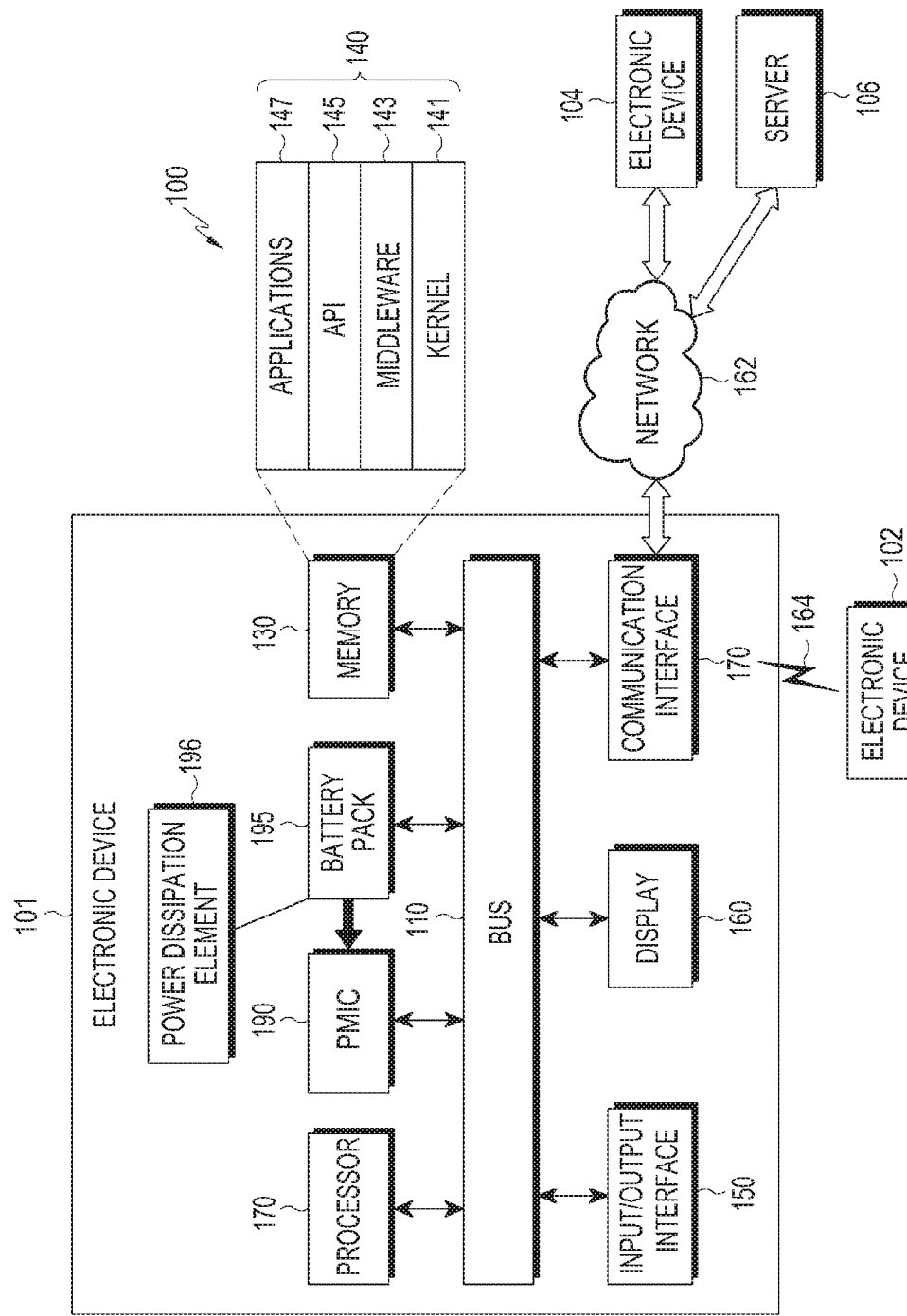
FIG. 1 is a block diagram illustrating an example electronic device in a network environment, according to various example embodiments of the present disclosure.

Hereinafter, various example embodiments of the present disclosure will be described with reference to the accompanying drawings. The example embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. In some situations, the expression "device configured to" may refer, for example, to a situation in which the device, together with other devices or components, "is able to". For example, the phrase "processor adapted (or configured) to perform A, B, and C" may refer, for example, and without limitation, to a dedicated processor (e.g., embedded processor) for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto. According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like), or the like, but is not limited thereto. In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

Referring to FIG. 1, an electronic device 101 in a network environment 100 is described, according to various example embodiments. The electronic device 101 may be implemented as a portable communication device. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170, a battery pack (e.g., including a battery 195, a power management integrated circuit 190 and a power dissipation element (e.g., including a discharging device/circuit) 196. In some embodiments, the electronic device 101 may exclude one or more elements or may have other elements added thereto.

The bus 110 may include a circuit for connecting the elements 110 to 195 with each other and for transferring communications (e.g., control messages or data) between the elements.

The processor 120 may include various processing circuitry, such as, for example, and without limitation, at least one of a dedicated processor, a central processing unit, an application processor, or a communication processor (CP), or the like. The processor 120, for example, may process calculation or data related to the control and/or communication of one or more other elements of the electronic device 101.

The memory 130 may include a volatile and/or nonvolatile memory. For example, the memory 130 may store instructions or data in relation to one or more other elements of the electronic device 101. According to an embodiment, the memory 130 may store software and/or programs 140. For example, the programs 140 may include a kernel 141, middleware 143, an application programming interface (API) 145, and/or an application programs (or "applications") 147. At least some of the kernel 141, the middleware 143, or the API 145 may be referred to as an operating system. The kernel 141, for example, may control or manage system resources (e.g., the bus 110, the processor 120, the memory 130, and the like), which are used to execute operations or functions that are implemented in other programs (e.g., the middleware 143, the API 145, or the application programs 147). In addition, the kernel 141 may provide an interface by which the middleware 143, the API 145, or the application programs 147 may access respective elements of the electronic device 101 for control or management of the system resources.

The middleware 143, for example, may play the intermediate role between the API 145 or the application programs 147 and the kernel 141 to communicate with each other for the transmission and reception of data. In addition, the middleware 143 may process one or more operation requests that are received from the application programs 147 according to the priority. For example, the middleware 143 may process one or more operation requests by giving priority for using the system resources (e.g., the bus 110, the processor 120, or the memory 130) of the electronic device 101 to at least one of the application programs 147. The API 145 may be an interface by which the application programs 147 control functions that are provided by the kernel 141 or the middleware 143, and, for example, may include one or more interfaces or functions (e.g., instructions) for file control, window control, image processing, or text control.

The input/output interface 150 may include various input/output circuitry and may, for example, transfer instructions or data received from a user or other external devices to other elements of the electronic device 101, or may output instructions or data received from other elements of the electronic device 101 to the user or other external devices.

The display 160, for example, may include a liquid crystal display (LCD), a light-emitting diode (LED) display, an organic light-emitting diode (OLED) display, a micro-electromechanical system (MEMS) display, or an electronic paper display, or the like, but is not limited thereto. For example, the display 160 may display a variety of content (e.g., text, images, videos, icons, and/or symbols) to the user. The display 160 may include a touch screen, and, for example, may receive a touch input, a gesture input, a proximity input, or a hovering input by using electronic pens or a user's body part.

The communication interface 170, for example, may establish communication between the electronic device 101 and external devices (e.g., a first external electronic device 102, a second external electronic device 104, or a server 106). For example, the communication interface 170 may include various communication circuitry and be connected to the network 162 through wireless communication or wired communication in order to thereby communicate with the external devices (e.g., the second external electronic device 104 or the server 106). Additionally, the communication interface 170 may, for example, and without limitation, establish a short-range wireless communication connection 164 between the electronic device 101 and, for example, and without limitation, one or more external electronic devices 102.

For example, the wireless communication may include cellular communication using at least one of LTE, LTE-A (LTE-Advanced), CDMA (code division multiple access), WCDMA (wideband CDMA), a UMTS (universal mobile telecommunications system), WiBro (Wireless Broadband), GSM (Global System for Mobile Communications), or the like. According to an embodiment, the wireless communication, for example, may include at least one of WiFi (wireless fidelity), Bluetooth, Bluetooth Low Energy (BLE), ZigBee, NFC (near field communication), Magnetic Secure Transmission, Radio Frequency (RF), or Body Area Network (BAN). According to an embodiment, the wireless communication may include a GNSS. The GNSS, for example, may be a GPS (Global Positioning System), a GLONASS (Global Navigation Satellite System), a Beidou Navigation Satellite System (hereinafter, "Beidou"), Galileo, or a European global satellite-based navigation system. Hereinafter, "GPS" may be used interchangeably with "GNSS" in the present specification. For example, the wired communication may include at least one of a USB (universal serial bus), an HDMI (high-definition multimedia interface), RS-232 (recommended standard 232), power line communication, or a POTS (plain old telephone service). The network 162 may include at least one of telecommunication networks, such as a computer network (e.g., LAN or WAN), the Internet, or a telephone network.

The first and second external electronic devices 102 and 104 may be the same as, or different from, the electronic device 101 as to the type thereof. According to various embodiments, at least some or all of the operations that are executed in the electronic device 101 may be executed by one or more other electronic devices (e.g., the electronic device 102 or 104, or the server 106). According to an embodiment, in the case where the electronic device 101 executes a specific function or service automatically or upon request, the electronic device 101 may make a request to other devices (e.g., the electronic device 102 or 104, or the server 106) for at least some of the functions related thereto additionally or instead of executing the same by itself. Other electronic devices (e.g., the electronic device 102 or 104, or the server 106) may execute the requested or additional functions, and may transfer the result of execution thereof to the electronic device 101. The electronic device 101 may provide the requested function or service by providing the received result without change or by additionally processing the same. To this end, for example, cloud computing, distributed computing, or client-server computing technology may be used.

A power management integrated circuit (PMIC) 190 may include various circuitry to supply power to a variety of hardware in the electronic device 101. The power management integrated circuit 190 may adjust power from a battery pack 195 to a voltage or current suitable for the variety of hardware to then supply the same thereto. When the battery pack 195 is in a normal state, power may be supplied from the battery pack 195 to the system (e.g., a variety of hardware) through the power management integrated circuit 190. Meanwhile, when the battery pack 195 is in an abnormal state, power may be supplied to a power dissipation element (e.g., including discharging circuitry) 196, instead of being supplied to the power management integrated circuit 190. Because heat may be emitted from the power dissipation element 196 and the amount of heat generated in the battery pack 195 may be reduced, burnout of the battery pack 195 may be prevented and/or reduced.

Figure 2:
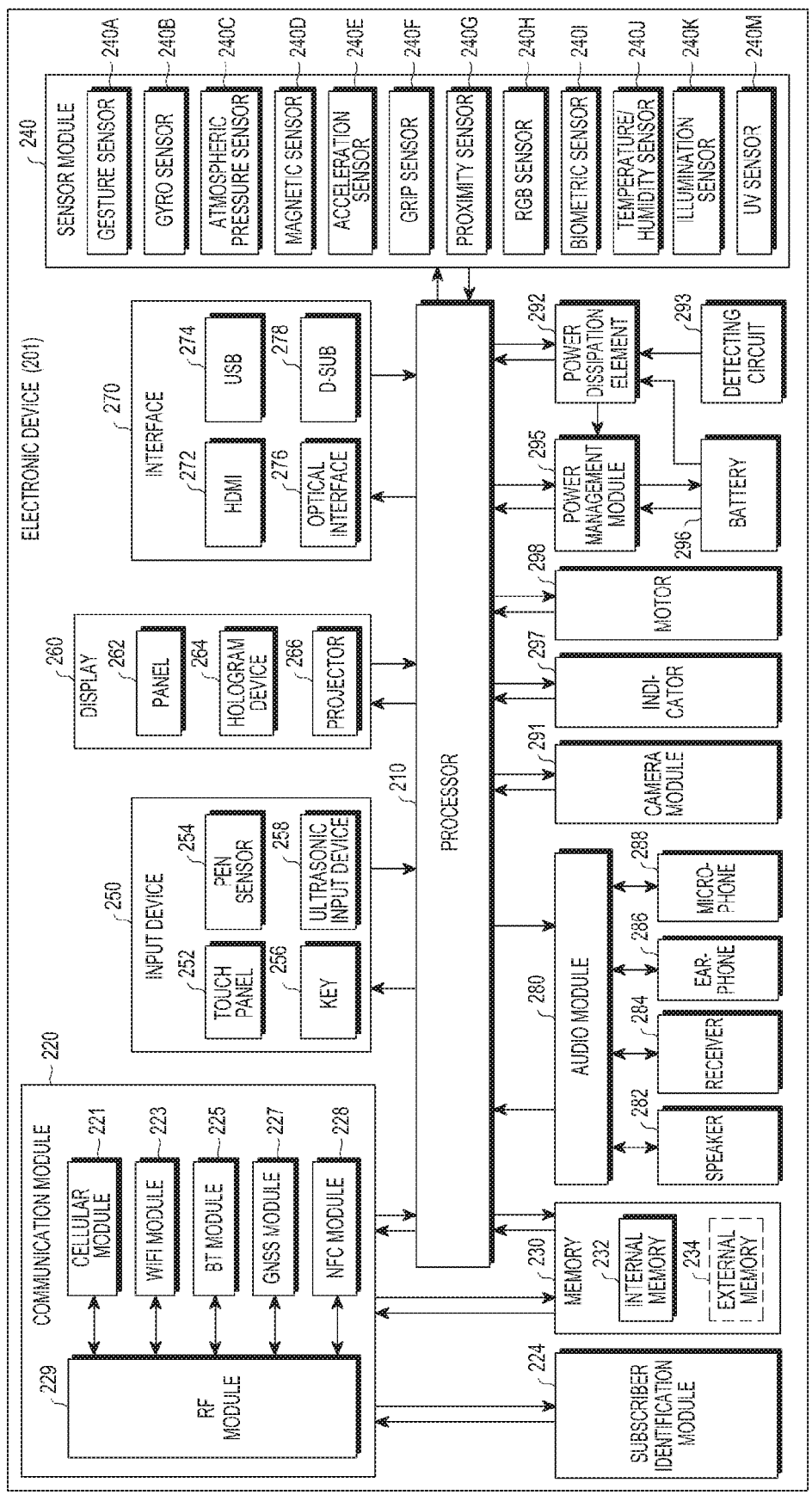
FIG. 2 is a block diagram illustrating an example electronic device, according to various example embodiments.

FIG. 2 is a block diagram illustrating an example electronic device 201, according to various example embodiments. The electronic device 201, for example, may include all or some of the elements of the electronic device 101 illustrated in FIG. 1. The electronic device 201 may include one or more processors (e.g., AP) (e.g., including processing circuitry) 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, or a motor 298.

The processor 210, for example, may include various processing circuitry and control a multitude of hardware or software elements connected with the processor 210, and may perform the processing of various pieces of data and calculation by executing an operating system or application programs. The processor 210 may be implemented by, for example, a system on chip (SoC). According to an embodiment, the processor 210 may further include a Graphic Processing Unit (GPU) and/or an image signal processor. The processor 210 may include at least some (e.g., the cellular module 221) of the elements shown in FIG. 2. The processor 210 may load instructions or data received from one or more other elements (e.g., a non-volatile memory) to a volatile memory to process the same, and may store result data thereof in a non-volatile memory.

The communication module 220, for example, may have a configuration the same as or similar to that of the communication interface 170. The communication module 220 may include various communication circuitry, such as, for example, and without limitation, one or more of a cellular module 221, a WiFi module 223, a Bluetooth module 225, a GNSS module 227, an NFC module 228, and an RF module 229. The cellular module 221, for example, may provide services of voice calls, video calls, text messaging, or the Internet through communication networks. According to an embodiment, the cellular module 221 may perform identification and verification of the electronic device 201 in communication networks using the subscriber identification module (e.g., a SIM card) 224. According to an embodiment, the cellular module 221 may perform at least some of the functions provided by the processor 210. According to an embodiment, the cellular module 221 may include a communication processor (CP). According to an example embodiment, at least some (e.g., two or more) of the cellular module 221, the WiFi module 223, the Bluetooth module 225, the GNSS module 227, or the NFC module 228 may be included in one integrated chip (IC) or one IC package. The RF module 229, for example, may transmit and receive communication signals (e.g., RF signals). The RF module 229, for example, may include a transceiver, a power amp module (PAM), a frequency filter, a low noise amplifier (LNA), or antennas. According to another embodiment, at least one of the cellular module 221, the WiFi module 223, the Bluetooth module 225, the GNSS module 227, or the NFC module 228 may transmit and receive RF signals through a separate RF module.

The subscriber identification module 224, for example, may include a card that adopts a subscriber identification module or an embedded SIM, and may contain inherent identification information (e.g., an integrated circuit card identifier (ICCID)) or subscriber information (e.g., an international mobile subscriber identity (IMSI)).

The memory 230 (e.g., the memory 130), for example, may include an internal memory 232 and/or an external memory 234. The internal memory 232, for example, may include at least one of volatile memories (e.g., a DRAM, an SRAM, an SDRAM, or the like) or non-volatile memories {e.g., a one-time programmable ROM (OTPROM), a PROM, an EPROM, an EEPROM, a mask ROM, a flash ROM, a flash memory, a hard drive, a solid state drive (SSD), or the like}. The external memory 234 may include a flash drive {such as compact flash (CF), secure digital (SD), Micro-SD, Mini-SD, extreme digital (xD), a multi-media card (MMC), or a memory stick}. The external memory 234 may be functionally and/or physically connected with the electronic device 201 through any of various interfaces.

The sensor module 240, for example, may measure physical quantities or may detect the operation state of the electronic device 201 to thereby convert the measured or detected information to electrical signals. The sensor module 240, for example, may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor}), a biometric sensor 240I, a temperature/humidity sensor 240J, an illuminance sensor 240K, or an ultra-violet (UV) sensor 240M. Alternatively or additionally, the sensor module 240, for example, may further include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In a certain embodiment, the electronic device 201 may further include a processor as a part of the processor 210 or separately from the processor 210, which is configured to control the sensor module 240 in order to thereby control the sensor module 240 while the processor 210 is in a sleep mode. At least some of the sensor module 240 may be included in the battery pack 195 of FIG. 1.

The input device 250 may include various input circuitry, such as, for example, and without limitation, one or more of a touch panel 252, a (digital) pen sensor 254, keys 256, or an ultrasonic input device 258. The touch panel 252 may use at least one of, for example, a capacitive type, a pressure-sensitive type, an infrared type, or an ultrasonic type. In addition, the touch panel 252 may further include a control circuit. The touch panel 252 may further include a tactile layer in order to thereby provide a user with a tactile reaction. The (digital) pen sensor 254, for example, may be a part of the touch panel, or may include a separate recognition sheet. The keys 256, for example, may include physical buttons, optical keys, or a keypad. The ultrasonic input device 258 may detect ultrasonic waves generated from input means through a microphone (e.g., a microphone 288), thereby identifying data corresponding to the detected ultrasonic waves.

The display 260 (e.g., the display 160) may include a panel 262, a hologram device 264, a projector 266, and/or a control circuit for controlling the same. The panel 262 may be implemented to be, for example, flexible, transparent, or wearable. The panel 262 may be configured with the touch panel 252 as one or more modules. According to an embodiment, the panel 262 may include a pressure sensor (or force sensor) capable of measuring the intensity of pressure of a user's touch. The pressure sensor may be implemented to be integral with the touch panel 252, or may be implemented as one or more sensors separated from the touch panel 252. The hologram device 264 may display 3D images in the air using light interference. The projector 266 may display images by projecting light onto a screen. The screen may be positioned, for example, inside or outside the electronic device 201.

The interface 270 may include various interface circuitry, such as, for example, and without limitation, one or more of an HDMI 272, a USB 274, an optical interface 276, or a D-subminiature (D-sub) interface 278. The interface 270, for example, may be included in the communication interface 170 shown in FIG. 1. Additionally or alternatively, the interface 270, for example, may include a mobile high-definition link (MHL) interface, an SD card/multimedia card (MMC) interface, or an infrared data association (IrDA) standard interface.

The audio module 280, for example, may convert a sound into an electric signal, and vice versa. At least some elements of the audio module 280, for example, may be included in the input/output interface 150 illustrated in FIG. 1. For example, the audio module 280 may process voice information that is input or output through a speaker 282, a receiver 284, earphones 286, or a microphone 288. The camera module 291, for example, may be a device for photographing still and moving images, and, according to an embodiment, the camera module 291 may include one or more image sensors (e.g., a front sensor or a rear sensor), lenses, an image signal processor (ISP), or a flash (e.g., an LED or a xenon lamp).

The power management module 295, for example, may manage power of the electronic device 201. According to an embodiment, the power management module 295 may include a power management integrated circuit (PMIC), a charger IC, or a battery or fuel gauge. The PMIC may be implemented as a wired charging type and/or a wireless charging type. The wireless charging type may encompass, for example, a magnetic resonance type, a magnetic induction type, or an electromagnetic wave type, and may further include additional circuits for wireless charging, such as coil loops, resonance circuits, or rectifiers. The battery gauge may measure, for example, the remaining power of the battery 296, a charging voltage, current, or temperature.

The battery 296 may include, for example, a rechargeable battery or a solar battery. The power dissipation element 292 may be supplied with power from the battery 296 to emit heat when the battery 296 is in an abnormal state. Here, the battery 296, for example, may be a battery pack. The detecting circuit 293 may be a circuit for detecting an abnormal state of the battery 296, and, for example, may include at least one of a voltage sensor, a current sensor, a temperature sensor, and a gas sensor. In addition to sensing, the detecting circuit 293 may connect or disconnect the power dissipation element 292 to or from the battery 296, and, for example, may output a control signal for controlling a field effect transistor (FET). The detecting circuit 293 may operate independently from the processor 110, and may operate under the control of the processor 110.

The indicator 297 may display a specific state (e.g., a booting state, a message state, or a charging state) of the whole or a part (e.g., the processor 210) of the electronic device 201. The motor 298 may convert an electric signal to a mechanical vibration, and may generate a vibration or a haptic effect. The electronic device 201 may include a device (e.g., a GPU) for supporting mobile TV, which processes media data according to standards, such as digital multimedia broadcasting (DMB), digital video broadcasting (DVB), or mediaFlo™.

The respective elements described in the present disclosure may be configured as one or more components, and the names of the elements may vary depending on the type of electronic device. In various embodiments, the electronic device (e.g., the electronic device 201) may be configured as a single entity by: excluding some elements thereof; further including additional elements; or combining some of the elements, which may perform the same functions as the original elements, which are not combined.

Figure 3:
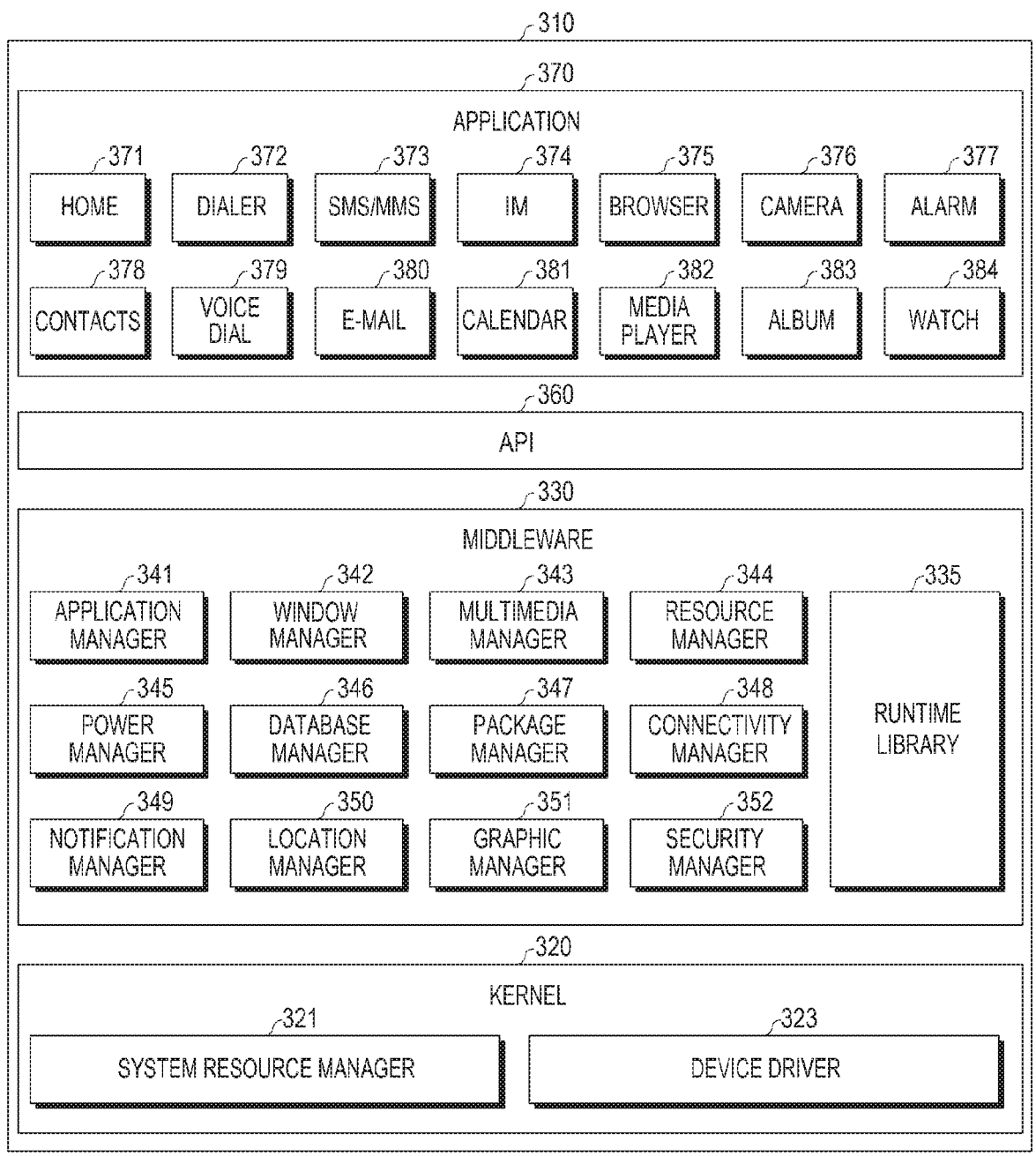
FIG. 3 is a block diagram illustrating an example program module, according to various example embodiments.

FIG. 3 is a block diagram illustrating an example program module, according to various example embodiments. According to an example embodiment, the program module 310 (e.g., the programs 140) may include an operating system for controlling resources that are related to the electronic device (e.g., the electronic device 101) and/or various applications (e.g., the application programs 147) that are operated under the operating system. For example, the operating system may include Android™, iOS™, Windows™, Symbian™, Tizen™, Bada™, or the like.

Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least some of the program module 310 may be preloaded in the electronic device, or may be downloaded from external electronic devices (e.g., the electronic devices 102 and 104 or the server 106).

The kernel 320, for example, may include a system resource manager 321 and/or a device driver 323. The system resource manager 321 may perform control, allocation, or collection of system resources. According to an embodiment, the system resource manager 321 may include a process management unit, a memory management unit, or a file system management unit. The device driver 323, for example, may include a display driver, a camera driver, a Bluetooth driver, a shared memory driver, a USB driver, a keypad driver, a Wi-Fi driver, an audio driver, or an inter-process communication (IPC) driver.

The middleware 330, for example, may provide functions required in common for the applications 370, or may provide the applications 370 with various functions through the API 360 in order to allow the applications 370 to use the limited system resources in the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352, or the like.

The runtime library 335, for example, may include a library module that a compiler uses in order to add new functions through programming languages while the applications 370 are executed. The runtime library 335 may perform input/output management, memory management, or an arithmetic function calculation. The application manager 341, for example, may manage life cycles of the applications 370. The window manager 342 may manage a GUI resource used in the screen. The multimedia manager 343 may identify formats for reproducing media files, and may perform encoding or decoding of media files by using a codec corresponding to each format. The resource manager 344 may manage source code of the applications 370 or space in memory. The power manager 345, for example, may manage the capacity, temperature, or power of a battery, and may determine and provide power information necessary for the operation of the electronic device by using corresponding information among them. According to an embodiment, the power manager 345 may interwork with a basic input/output system (BIOS). The database manager 346, for example, may create, retrieve, or change a database to be used in the applications 370. The package manager 347 may manage the installation or update of the applications that are distributed in the form of a package file.

The connectivity manager 348, for example, may manage a wireless connection. The notification manager 349 may provide events (e.g., received messages, appointments, or proximity notifications) to the user. The location manager 350, for example, may manage location information of the electronic device. The graphic manager 351, for example, may manage graphic effects to be provided to the user or user interfaces related thereto.

The security manager 352, for example, may provide system security or user verification. According to an embodiment, the middleware 330 may include a telephony manager for managing the functions of a voice call or a video call of the electronic device, or may include a middleware module for configuring a combination of functions of the abovementioned elements. According to an embodiment, the middleware 330 may provide a module that is specialized according to the type of operating system. The middleware 330 may dynamically exclude some of the typical elements or add new elements.

The API 360, for example, may be a group of API programming functions, and may be provided with a different configuration according to an operating system. For example, one set of APIs may be provided to each platform in the case of Android or iOS, and two or more sets of APIs may be provided to each platform in the case of Tizen.

The applications 370, for example, may include applications of home 371, a dialer 372, SMS/MMS 373, instant messages (IM) 374, a browser 375, a camera 376, an alarm 377, contacts 378, a voice dialer 379, e-mail 380, a calendar 381, a media player 382, an album 383, a watch 384, or the like. Additionally or alternatively, though not shown, the applications 370 may include applications relating to, for example, healthcare (e.g., measuring the amount of exercise or blood glucose), and providing environment information (e.g., providing atmospheric pressure, humidity, or temperature information). According to an embodiment, the applications 370 may include an information-exchange application that supports the exchange of information between the electronic device and external electronic devices. The information-exchange application, for example, may include a notification relay application for relaying specific information to the external electronic devices or a device management application for managing the external electronic devices. For example, the notification relay application may transfer notification information generated in other applications of the electronic device to the external electronic devices, or may receive notification information from the external electronic devices to then provide the same to the user. The device management application, for example, may install, delete, or update functions {e.g., turning on and off the external electronic device (or some components thereof) or adjusting the brightness (or resolution) of a display} of the external electronic device that communicates with the electronic device or applications executed in the external electronic device. According to an embodiment, the applications 370 may include applications (e.g., the healthcare application of a mobile medical device) that are designated according to the attributes of the external electronic device. According to an embodiment, the applications 370 may include applications received from the external electronic devices. At least some of the program module 310 may be implemented (executed) by software, firmware, hardware (e.g., the processor 210), or a combination thereof, and may include modules, programs, routines, sets of instructions, or processors for executing one or more functions.

The term "module" used in the present disclosure may include a unit configured as hardware, software, or firmware, and any combinations thereof, and, for example, may be used interchangeably with terms, such as logic, a logic block, a component, or a circuit. The "module" may be a component that is integrally configured, or may be a minimum unit for performing one or more functions or a part thereof. The "module" may be implemented mechanically or electronically, and, for example, and without limitation, may include a dedicated processor, a CPU, application-specific integrated circuit (ASIC) chips, field-programmable gate arrays (FPGAs), or programmable logic devices for executing some operations, which are known or will be known.

At least some of the devices (e.g., modules or functions thereof) or methods (e.g., operations), according to various embodiments, may be implemented as instructions in the form of a program module, which are stored in a computer-readable recording medium (e.g., the memory 130). When the instructions are executed by a processor (e.g., the processor 120), the processor may perform functions corresponding to the instructions. The computer-readable recording medium may include a hard disk, a floppy disk, a magnetic medium (e.g., a magnetic tape), an optical recording medium {e.g., CD-ROM, DVD, a magnetic-optical medium (e.g., a floptical disk)}, an internal memory, and the like. The instructions may include codes that are made by a compiler or codes that are executable by an interpreter.

The module or program module, according to various embodiments, may include at least one of the elements described above, exclude some thereof, or further include other elements. The module, program module, or operations executed by other elements, according to various embodiments, may be performed in sequence, in parallel, repeatedly, or heuristically. Alternatively, at least some operations may be performed in a different order, or may be omitted, or other operations may be added thereto.

Figure 4A:
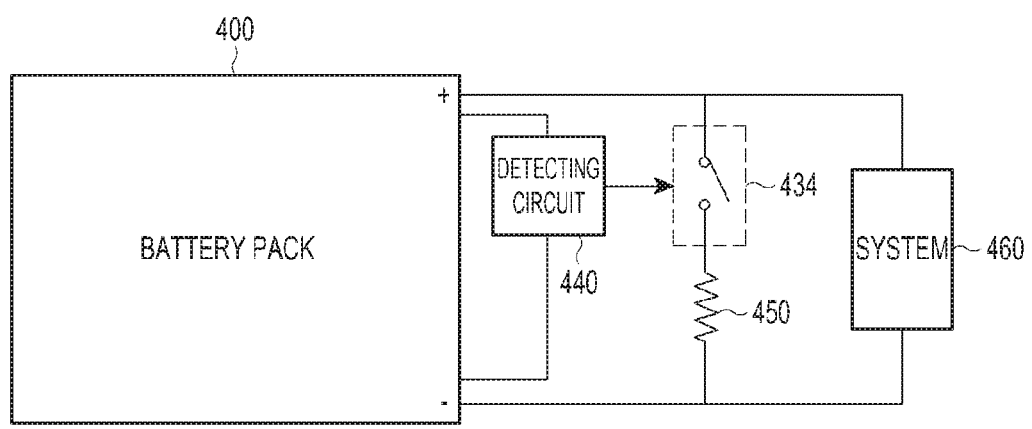
FIG. 4A is a block diagram illustrating an example electronic device, according to various example embodiments of the present disclosure.

FIG. 4A is a block diagram illustrating an example electronic device, according to various example embodiments of the present disclosure.

As illustrated in FIG. 4A, the electronic device (e.g., the electronic device 101, 102 or 201) may include a battery pack 400, a switch 434, a detecting circuit 440 (e.g., the detecting circuit 293), a power dissipation element (e.g., including a circuit and/or circuit component/element) 450, and a system 460. Meanwhile, although it is not shown in the drawing, the electronic device 101 may further include a switch between the battery pack 400 and the system 460, which will be described in greater detail below with reference to FIG. 4B.

The battery pack 400 may, for example, be a product having a housing, and, for example, may include a battery cell and one or more devices for over-voltage protection (OVP), over-current protection (OCP), or over-temperature protection (OTP). The battery cell may actually generate an electromotive force, and, for example, may include elements such as a positive electrode plate, a negative electrode plate, a separator, an electrolyte, and the like. The battery pack 400 may be electrically connected to the electronic device 101, and may provide the electronic device 101 with power having a predetermined voltage and current through a power line. Depending on the specification of the electronic device 101, the battery pack 400 may be implemented to be integral with the electronic device 101, or may be implemented to be detachable from the electronic device 101. The battery pack 400, for example, may be a secondary battery, such as a lithium-ion battery. Although the battery pack 400 may have a rectangular shape or the like in the case where the electronic device 101 is realized as a small mobile terminal, such as a smart phone, those skilled in the art will easily understand that the type or form of the battery pack 400 is not limited.

The electronic device 101 may detect whether the battery pack 400 is in a normal state or in an abnormal state. The electronic device 101 may detect whether the battery pack 400 or the battery cell disposed in the battery pack 400 is in a normal state or in an abnormal state based at least in part on a magnitude of a voltage applied to both ends of the battery pack 400. The electronic device 101 (e.g., the detecting circuit 440) may detect whether the battery cell is in a normal state or in an abnormal state using a voltage between the positive electrode and the negative electrode of the battery pack 400 (e.g., an output voltage of the battery pack 400). For example, if the magnitude of a voltage applied to both ends of the battery pack 400 is equal to or less than a threshold value (for example, 2.3 V or 2.5 V), the electronic device 101 may detect that the battery pack 400 or the battery cell is in an abnormal state. For example, the electronic device 101 may detect the normal or abnormal state of the battery cell depending on whether or not a predetermined condition associated with the magnitude of a voltage applied to the both ends of the battery pack 400 is satisfied. The state of the battery cell, for example, may also be referred to as the state of the battery pack. Meanwhile, as will be described in greater detail below, when the magnitude of a voltage applied to the both ends of the battery pack 400 falls within a first range (for example, more than 2.5 V), the electronic device 101 may detect that the battery cell is in a normal state. When the magnitude of a voltage applied to the both ends of the battery pack 400 falls within a second range (for example, more than 2.3 V and equal to or less than 2.5 V), the electronic device 101 may detect that the battery cell is in a reserved state. When the magnitude of a voltage applied to both ends of the battery pack 400 falls within a third range (for example, equal to or less than 2.3 V), the electronic device 101 may detect that the battery cell is in an abnormal state. Here, the reserved state may be in the range between the normal state and the abnormal state, and may refer, for example, to the state in which the battery pack 400 can execute a preparatory operation prior to performing an operation in response to the abnormal state before entering the abnormal state from the normal state.

When the electronic device 101 (e.g., the protecting circuit 480) detects that the battery pack 400 (or the battery cell 410) is in a normal state, power may be supplied to the system 460 from the battery pack 400. The system 460 may refer to a variety of hardware of the electronic device 101. For example, according to an embodiment, when the battery pack 400 is in a normal state, the detecting circuit 440 may control a fourth switch 434 to be turned off, so that a current output from the battery pack 400 may be supplied to the system 460, instead of the power dissipation element 450. Meanwhile, as described above, since power may be supplied to the PMIC from the battery pack 400 and the PMIC may process and provide the power so as to be suitable for each piece of hardware in the electronic device 101, the system 460 may include the PMIC.

When the battery pack 400 is detected as being in an abnormal state, the electronic device 101 (e.g., the protecting circuit 480) may make a control such that power may be supplied to the power dissipation element 450 from the battery pack 400. According to an embodiment, the electronic device 101 (e.g., the detecting circuit 440), for example, may control the fourth switch 434, which is disposed outside the battery pack 400, to switch from the off state to the on state. In the case where the fourth switch 434 is implemented as a FET, the electronic device 101 (e.g., the detecting circuit 440) may convert the state of the switch 434 by generating a gate control signal of the FET and applying the same to the gate of the FET. Meanwhile, it will be easily understood by those skilled in the art that the fourth switch 434 may be implemented as various alternative implementations, such as free-wheeling, as well as the FET, and that the type of fourth switch 434 is not limited. In various embodiments of the present disclosure, power may be supplied to the power dissipation element 450 and the system 460, and the power dissipation element 450, for example, may be designed to have lower resistance than the internal resistance of the system 460 or the battery pack 400. In this case, most of the current may flow to the power dissipation element 450 from the battery cells in the battery pack 400, and thus power may be effectively dispersed to the outside of the battery pack 400 from the battery pack 400. The electronic device 101 (e.g., the protecting circuit 480), for example, may make a control to turn off a switch (not shown) between the battery pack 400 and the system 460 such that power is not supplied to the system 460 from the battery pack 400. In this case, the power dissipation element 450, for example, may be designed to have a lower resistance than the internal resistance of the system 460 or the battery pack 400. Accordingly, most of the current may flow to the power dissipation element 450 from the battery cells in the battery pack 400, and thus power may be effectively dispersed to the outside of the battery pack 400 from the battery pack 400. The power dissipation element 450 may be disposed physically outside the battery pack 400. The power dissipation element 450 may be disposed substantially in contact with the battery pack 400, or may be disposed to be spaced a predetermined distance apart therefrom.

The power dissipation element 450 may be supplied with power from the battery pack 400 during operation in an abnormal state, and may release heat by dissipating the supplied power. The power dissipation element 450, in terms of circuit analysis, may be implemented in various forms, such as, for example, and without limitation, a single resistor, a plurality of resistors connected in series, a plurality of resistors connected in parallel, or the like. The power dissipation element 450 may be implemented, for example, and without limitation, as wires or resistant devices, or may be implemented as hardware of the electronic device 101. For example, a heat pipe for releasing heat of the AP, a camera module, or the like, of the electronic device 101 may be used as the power dissipation element 450, which will be described in greater detail below. Accordingly, the power dissipation element 450 may share and consume the energy generated in the battery pack 400. At least one of the above-described elements will be described in more detail with reference to FIG. 4B.

Figure 4B:
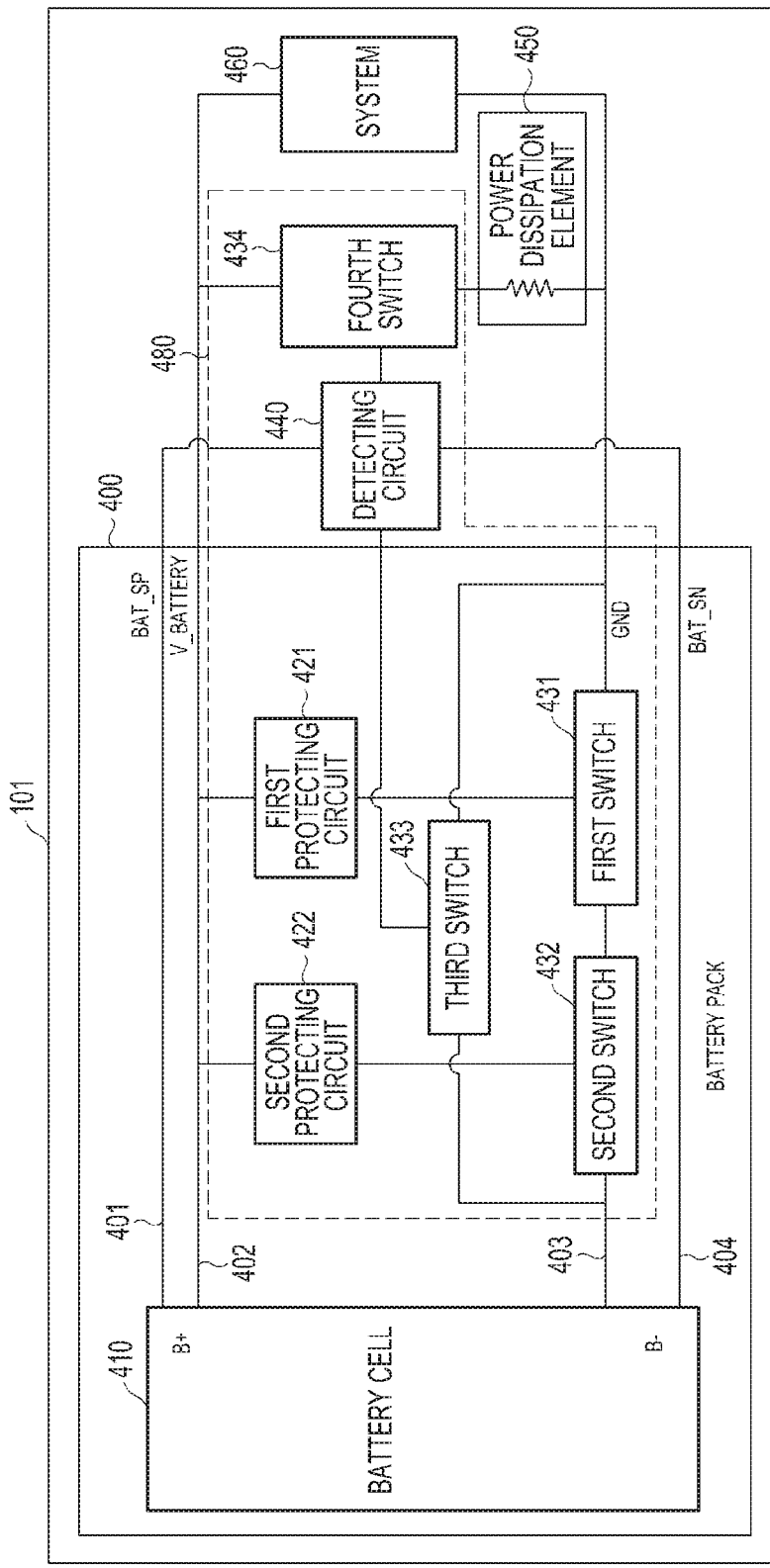
FIG. 4B is a block diagram illustrating an example electronic device, according to various example embodiments of the present disclosure.

FIG. 4B is a block diagram illustrating an example electronic device, according to various example embodiments of the present disclosure.

As illustrated in FIG. 4B, the battery pack 400 may include a battery cell 410, a first protecting circuit 421, a second protecting circuit 422, a first switch 431, a second switch 432, and a third switch 433. The electronic device 101 may include a detecting circuit 440, a fourth switch 434, a power dissipation element (e.g., including a circuit and/or circuit component/element) 450, and a system 460, which are disposed outside the battery pack 400. That is, the detecting circuit 440, the fourth switch 434, the power dissipation element 450, and the system 460 may be disposed outside the housing of the battery pack 400 so as to be physically spaced apart therefrom.

The first protecting circuit 421 and the second protecting circuit 422 may control the states of the first switch 431 and the second switch 432. For example, when at least one of OVP, OCP, and OTP is generated, the first protecting circuit 421 may control the first switch 431 to switch from the on state to the off state in response thereto. In addition, when at least one of OVP, OCP, and OTP is generated, the second protecting circuit 422 may control the second switch 432 to switch from the on state to the off state in response thereto. In various embodiments, at least one of the first protecting circuit 421 and the second protecting circuit 422 may control at least one of the first switch 431 and the second switch 432 to switch from the on state to the off state when the voltage of the battery pack 410 drops to or below, for example, 2.5 V. At least one of the first protecting circuit 421 and the second protecting circuit 422 may be included in the battery pack 400 in order to perform a typical OVP, OCP, or OTP operation, and at least one of the first protecting circuit 421 and the second protecting circuit 422 may be implemented to not be included in the battery pack 400 according to the implementation. For example, when the generation of OVP, OCP, or OTP of the battery pack 400 is detected, since at least one of the first protecting circuit 421 and the second protecting circuit 422 can control the state of at least one of the switches 431 and 432, power may not be supplied to the system 460 from the battery cell 410. Meanwhile, in various embodiments of the present disclosure, the states of the first switch 431 and the second switch 432 may be controlled by a protecting circuit 480, or may be controlled by a detecting circuit 440 in another embodiment.

The detecting circuit 440, for example, may be electrically connected to at least one of a positive electrode (B+) and a negative electrode (B−) of the battery cell 410, and accordingly, may measure a voltage applied to the positive electrode (B+) and the negative electrode (B−) of the battery cell 410. The detecting circuit 440 may be connected to the positive electrode (B+) and the negative electrode (B−) of the battery cell 410 through paths 401 and 404 for detection, which are different from paths 402 and 403 for power supply. The positive electrode (B+) and the negative electrode (B−) of the battery cell 410 may be referred to as, for example, a positive electrode and a negative electrode of the battery pack 400. The battery cell 410, for example, may include four output terminals (B+, B−, BAT_SP, and BAT_SN). The output terminal (BAT_SP) may refer to a terminal for sensing the voltage of the positive (B+) terminal of the battery pack 400, and "BAT_SP" may be an abbreviation for "battery sense positive". The output terminal (BAT_SN) may refer to a terminal for sensing a voltage of the negative (B−) terminal of the battery pack 400, and "BAT_SN" may be an abbreviation for "battery sense negative". A positive electrode terminal and a negative electrode terminal may be provided in the battery tabs of the battery cell 410, and a plurality of paths may branch off from the respective electrodes, wherein one path 401 or 404 may be used for detection and the other path 402 or 403 may be used for power supply. In various embodiments of the present disclosure, the width between the paths 401 and 404 for detection on the PCB may be greater than the width between paths 402 and 403 for power supply on the PCB.

For example, a battery voltage (V_BATTERY) may be applied to the path 402 for power supply. It is possible to prevent over-current from flowing to the detecting circuit 440 by setting two different lines. Meanwhile, in another embodiment, the detecting circuit 440 may also be connected to a path branching off from the paths 402 and 403 for power supply, and in this case, the paths 401 and 404 for detection may not be included in the electronic device 101. The detecting circuit 440 may detect whether the battery pack 400 or the battery cell 410 is in an abnormal state depending on whether a measured voltage is equal to or less than a predetermined threshold value (for example, 2.3 V or 2.5 V). For example, when a voltage output from the battery cell 410 is detected to be equal to or less than a predetermined threshold value (e.g., 2.3 V or 2.5 V), the detecting circuit 440 may control the fourth switch 434 to be turned on. The detecting circuit 440 may include means for controlling the state of another switch (e.g., the third switch 433 or the fourth switch 434) by using, for example, an input voltage. For example, when the voltage (V_BATTERY) output from the battery drops to or below a predetermined threshold value at an input terminal of the detecting circuit 440, the detecting circuit 440 may turn on at least one switch (e.g., the FET), so that a current may flow to the power dissipation element 450 from the battery cell 410. In another embodiment, the detecting circuit 440 may be turned on when the battery voltage is equal to or less than a threshold value, and thereafter, may control the on/off states of the switches.

Figure 7A:
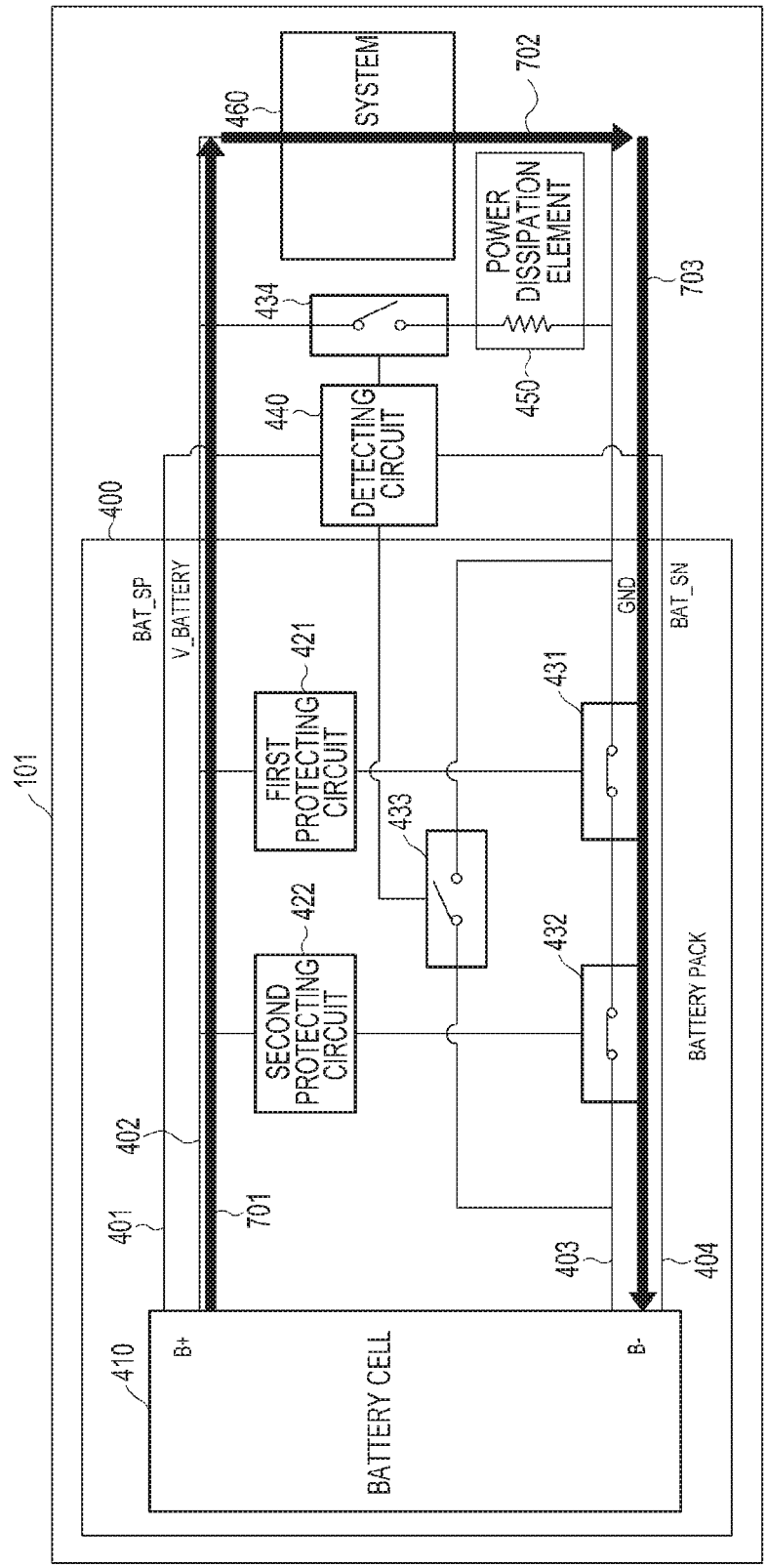
FIGS. 7A, 7B and 7C are diagrams illustrating examples of switch state control and power supply direction, according to various example embodiments of the present disclosure.

Meanwhile, in an abnormal state of the battery cell 410, the detecting circuit 440 may control the third switch 433 to be turned on so that power may be supplied to the power dissipation element 450, which will be described in greater detail below with reference to FIG. 7A. Accordingly, when a specified condition, in which a voltage applied to both ends of the battery cell 410 drops to or below a threshold value (e.g., 2.3V or 2.5V), is detected, the power output from the battery cell 400 may be supplied to the power dissipation element 450. Meanwhile, in various embodiments of the present disclosure, when a specified condition, in which a voltage applied to both ends of the battery cell 410 drops to or below the first threshold value (e.g., 2.5 V), is detected, the first switch 431 and the second switch 432 may be preferentially controlled to be turned off. The first switch 431 and the second switch 432 may be controlled by the first protecting circuit 421 and the second protecting circuit 422. Thereafter, when a condition, in which a voltage applied to both ends of the battery cell 410 drops to or below the second threshold value (e.g., 2.3 V), is detected, the third switch 433 and the fourth switch 434 may be controlled to be turned on. The detecting circuit 440 may detect various parameters, such as voltage, temperature, gas concentration, and the like. The detecting circuit 440 may control the on/off state of at least one of the switches 433 and 434 depending on whether the various detected parameters satisfy predetermined conditions.

According to various embodiments, the detecting circuit 440 may control one or more switches (e.g., the third switch 433 or the fourth switch 434). According to an embodiment, the detecting circuit 440 may monitor the state of the battery pack 400 periodically or according to a specified condition when the power dissipation element 450 is in an open state in which the power dissipation element 450 is electrically disconnected from the battery pack 400. As a result of the monitoring, if the state of the battery pack 400 does not satisfy a specified condition (for example, a specified voltage or temperature value) (for example, the battery pack 400 is in a normal state), the detecting circuit 440 may maintain the state in which the power dissipation element 450 is electrically disconnected from the battery pack 400. As a result of the monitoring, if the state of the battery pack 400 satisfies a specified condition (for example, a specified voltage or temperature value) (for example, the battery pack 400 is in an abnormal state), the detecting circuit 440 may output an electrical signal corresponding to the satisfied condition to at least one switch (e.g., the third switch 433 or the fourth switch 434), thereby controlling at least one switch (e.g., the third switch 433 or the fourth switch 434) to allow the power dissipation element 450 to be electrically connected to the battery pack 400.

Meanwhile, although the detecting circuit 440 is illustrated as being disposed outside the battery pack 400 in FIG. 4B, this is only an example. It will be easily understood by those skilled in the art that the detecting circuit 440 may also be disposed inside the battery pack 400 and that the detecting circuit 440 is not limited to a specific position. In addition, although FIG. 4B illustrates that the third switch 433 is disposed inside the battery pack 400 and the fourth switch 434 is disposed outside the battery pack 400 and the detecting circuit 440, the positions of the switches 433 and 434 are also examples. In various embodiments of the present disclosure, the detecting circuit 440 may include one of either the third switch 433 or the fourth switch 434, or may include both the third switch 433 and the fourth switch 434. Meanwhile, in various embodiments of the present disclosure, at least one of the first switch 431, the second switch 432, the third switch 433, the fourth switch 434, the first protecting circuit 421, the second protecting circuit 422, and the detecting circuit 440 may be implemented as a single protecting circuit 480. The protecting circuit 480 may be configured in a variety of forms, for example, by deleting, merging, or differently connecting at least some of the circuits or switches included therein. Meanwhile, the protecting circuit 480 may control the power output from the battery pack. For example, the protecting circuit 480 may detect the state of the battery pack 400, and if the state thereof does not satisfy a specified condition, the protecting circuit 480 may control the battery pack 400 to be electrically connected to the system 460 (e.g., a power management integrated circuit), instead of controlling the battery pack 400 to be electrically connected to the power dissipation element 450. When the state satisfies a specified condition, the protecting circuit 480 may control the battery pack 400 to be electrically connected to the power dissipation element 450, instead of controlling the battery pack 400 to be electrically connected to the system 460 (e.g., a power management integrated circuit).

According to the above-described procedure, when the battery pack 400 or the battery cell 410 enters an abnormal state, the electronic device 101 may supply power to the power dissipation element 450 outside the battery pack 400, so that the energy generated inside the battery pack 400 can be dispersed to the external power dissipation element 450. For example, in the case where the battery cell 410 is a lithium-ion battery, heat may be generated from an internal short circuit (ISC) upon the formation thereof and the heat may cause a burnout. When a separator in the battery cell 410 is damaged for some reasons, a short circuit is formed between the positive electrode (B+) and the negative electrode (B−) so that energy is concentrated on a specific point, which may cause a burnout. For example, a burnout may be caused by overcharging of the battery cell 410. When the battery 410 is charged with a voltage and current higher than a rated voltage, lithium ions exceeding the amount of lithium ions that can be accepted in the negative electrode are dissociated from the positive electrode to then accumulate on the surface of the negative electrode. In this case, lithium (Li) plating occurs on the surface of the negative electrode so that a lithium (Li) metal grows in a dendrite shape. This dendrite-shaped lithium metal may cause penetration through the separator and a short circuit between the negative electrode and the positive electrode. For example, a burnout may occur due to over-discharging of the battery. In the case where the battery cell 410 is discharged at a lower voltage than a rated voltage, the decomposition reaction of a copper (Cu) foil, which is a negative collector plate, is promoted. In this case, copper (Cu) plating may occur on the negative electrode, and in this case, lithium ions are prevented from passing through a negative active material in order to thereby facilitate the generation of lithium plating. For example, a burnout may be caused by the charging of the battery at a low temperature. When the battery pack 400 is charged in a low-temperature environment, the viscosity of the electrolyte in the battery increases, so that the mobility of the lithium ion decreases in the electrolyte and the diffusion of the lithium ions through the active material is degraded. Therefore, when the battery is charged in a low-temperature environment, lithium ions are easily accumulated on the surface of the negative electrode, thereby facilitating the generation of lithium plating. For example, a burnout may be caused by an external impact to the battery pack 400.

In the case where the terminal or the battery itself is applied with an external impact, a separator may be damaged. At this time, a short circuit may occur between the positive electrode and the negative electrode. For example, a burnout may be caused by penetration through the battery. When the terminal or the battery cell 410 is penetrated, a short circuit may occur between the positive electrode and the negative electrode. For example, a burnout may be caused by the formation of an internal short circuit (ISC) due to introduction of foreign substances into the battery. When foreign substances are introduced into the battery, the separator may be damaged and thus a burnout may occur. The amount of heat may be usually maximized when the resistance of the internal short circuit is in the range of $0.1\Omega$ to $1\Omega$. As described above, according to various embodiments, it is possible to prevent and/or reduce a burnout of the battery pack 400 because energy can be dispersed to the outside of the battery pack 400.

In various embodiments of the present disclosure, the power dissipation element 450 may be disposed outside the battery pack 400. The detecting circuit 440 may detect the state of the battery pack 400. The electronic device 101 may include at least one switch (e.g., the fourth switch 434) connected to the battery pack 400 and the detecting circuit 440. The detecting circuit 440 may be configured to control at least one switch (e.g., the fourth switch 434) such that the power dissipation element 450 is electrically disconnected from the battery pack 400 when the state of the battery pack 400 does not satisfy a specified condition and the power dissipation element 450 is electrically connected to the battery pack 400 when the state of the battery pack 400 satisfies a specified condition.

In various embodiments of the present disclosure, the electronic device 101 may further include a power management integrated circuit (PMIC) (not shown) that is connected to the battery pack 400 for managing the power of the battery pack 400. As described above, the power management integrated circuit, for example, may be included in the system 460. The power management integrated circuit (e.g., the system 460) may be electrically connected to the battery pack 400 when the state of the battery pack 400 does not satisfy a specified condition.

In various embodiments of the present disclosure, the electronic device 101 may further include at least one switch (e.g., the first switch 431 or the second switch 432), which is disposed inside the battery pack 400 for selectively connecting the battery pack 400 and the power management integrated circuit (for example, the system 460).

In various embodiments of the present disclosure, the electronic device 101 may further include at least one switch (e.g., the third switch 433), which is connected in parallel with at least one switch (the first switch 431 or the second switch 432) disposed inside the battery pack 400 and that connects the battery pack 400 to the power dissipation element 450 when the state of the battery pack 400 satisfies a specified condition.

In various embodiments of the present disclosure, the electronic device 101 may further include at least one protecting circuit (e.g., the first protecting circuit 421 or the second protecting circuit 422), which is connected to at least one switch (e.g., the first switch 431 or the second switch 432) in the battery pack 400. At least one protecting circuit (e.g., the first protecting circuit 421 or the second protecting circuit 422) may control a switch (e.g., the switch 431 or the switch 432) so as not to supply power to the power management integrated circuit when the state of the battery pack 400 satisfies another specified condition.

In various embodiments of the present disclosure, the detecting circuit 440 may detect at least one of a voltage applied to the positive electrode (B+) and the negative electrode (B−) of the battery pack 400, the temperature of the battery pack 400, or a gas concentration around the battery pack 400. When at least one of the voltage, the temperature, or the gas concentration falls within a specified range, the detecting circuit 440 may control at least one switch (e.g., the fourth switch 434) to be turned on so that power is supplied to the power dissipation element 450 from the battery pack 400. The detecting circuit 440 may include one or more sensors for detecting values corresponding to the voltage, the temperature, or the gas concentration.

In various embodiments of the present disclosure, the power dissipation element 450 may include various circuit components or elements, such as, for example, and without limitation, a plurality of resistors connected in series or parallel with each other. When the power dissipation element 450 is configured as a plurality of resistors connected in parallel, some of the plurality of resistors may be connected to the battery pack 400.

In various example embodiments of the present disclosure, the electronic device 101 may include: a battery pack 400; a power management integrated circuit (PMIC) (not shown) that supplies power output from the battery pack 400 to the electronic device 101; a power dissipation element 450 that is disposed outside the battery pack 400; and a protecting circuit (e.g., the protecting circuit 480) that controls power output from the battery pack 400. The protecting circuit (e.g., the protecting circuit 480) may detect the state of the battery pack 400, and may electrically disconnect the battery pack 400 from the power dissipation element 450 and electrically connect the battery pack 400 to the power management integrated circuit (e.g., the system 460) when the state does not satisfy a specified condition. The protecting circuit (e.g., the protecting circuit 480) may electrically connect the battery pack 400 to the power dissipation element 450 and electrically disconnect the battery pack 400 from the power management integrated circuit (e.g., the system 460) when the state satisfies a specified condition.

In various example embodiments of the present disclosure, at least a part of the protecting circuit (e.g., the protecting circuit 480) may be disposed outside the battery pack 400.

In various example embodiments of the present disclosure, the protecting circuit (e.g., the protecting circuit 480) may include one or more switches that electrically connect or disconnect the battery pack 400 to or from the power dissipation element 450 or the power management integrated circuit (e.g., the system 460).

In various example embodiments of the present disclosure, one or more switches may include a switch (e.g., the first switch 431 or the second switch 432) that operates to supply power to the power management integrated circuit (e.g., the system 460) and another switch (e.g., the fourth switch 434) that operates to interrupt the supply of power to the power dissipation element 450 when the state does not satisfy a specified condition.

In various example embodiments of the present disclosure, a switch (e.g., the first switch 431 or the second switch 432) may operate to interrupt the supply of power to the power management integrated circuit (e.g., the system 460) and another switch (e.g., the fourth switch 434) may operate to supply power to the power dissipation element 450 when the state satisfies a specified condition. In various example embodiments of the present disclosure, at least a part of a switch (e.g., at least one of the first switch 431 and the second switch 432) may be disposed inside the battery pack 400.

In various example embodiments of the present disclosure, the electronic device 101 may further include a switch (e.g., the third switch 433) that is connected in parallel to the switch (e.g., at least one of the first switch 431 and the second switch 432), wherein the switch (e.g., the third switch 433) may operate such that power is supplied to the power dissipation element 450 while bypassing the switch (e.g., at least one of the first switch 431 and the second switch 432) when the state satisfies a specified condition.

In various example embodiments of the present disclosure, the protecting circuit (e.g., the protecting circuit 480) may detect a voltage applied between a positive electrode (B+) and a negative electrode (B−) of the battery pack 400, a temperature of the battery pack 400, or a gas concentration around the battery pack 400. When at least one of the voltage, the temperature, or the gas concentration falls within a specified range, the protecting circuit (e.g., the protecting circuit 480) may be electrically connected such that power output from the battery pack 400 may be supplied to the power dissipation element 450.

In various example embodiments of the present disclosure, the power dissipation element 450 may include a plurality of resistors that are connected in parallel to each other, and the protecting circuit (e.g., the protecting circuit 480) may connect some of the plurality of resistors to the battery pack 400 when the state satisfies a specified condition.

In various example embodiments of the present disclosure, the battery pack 400 may include: a housing; a battery cell 410 that is disposed inside the housing; and one or more switches (e.g., the switch 431, the switch 432, and the switch 433) that are disposed inside the battery cell 410 and the housing, wherein the one or more switches (e.g., the switch 431, the switch 432, and the switch 433) may be configured to: electrically connect the battery cell 410 to a power management integrated circuit (e.g., the system 460) disposed outside the battery pack 400 and electrically disconnect the battery cell 410 from the power dissipation element 450 disposed outside the battery pack 400 when the state of the battery cell 410 does not satisfy a specified condition; and electrically disconnect the battery cell 410 from the power management integrated circuit (e.g., the system 460) and electrically connect the battery cell 410 to the power dissipation element 450 when the state of the battery cell satisfies a specified condition.

In various example embodiments of the present disclosure, the battery pack 400 may further include a detecting circuit that is configured to: detect the state of the battery cell 410; and provide a signal corresponding to the detected state to one or more switches (e.g., the switch 431, the switch 432, and the switch 433). That is, as described above, the detecting circuit 440 may be disposed inside the battery pack 400.

Figure 4C:
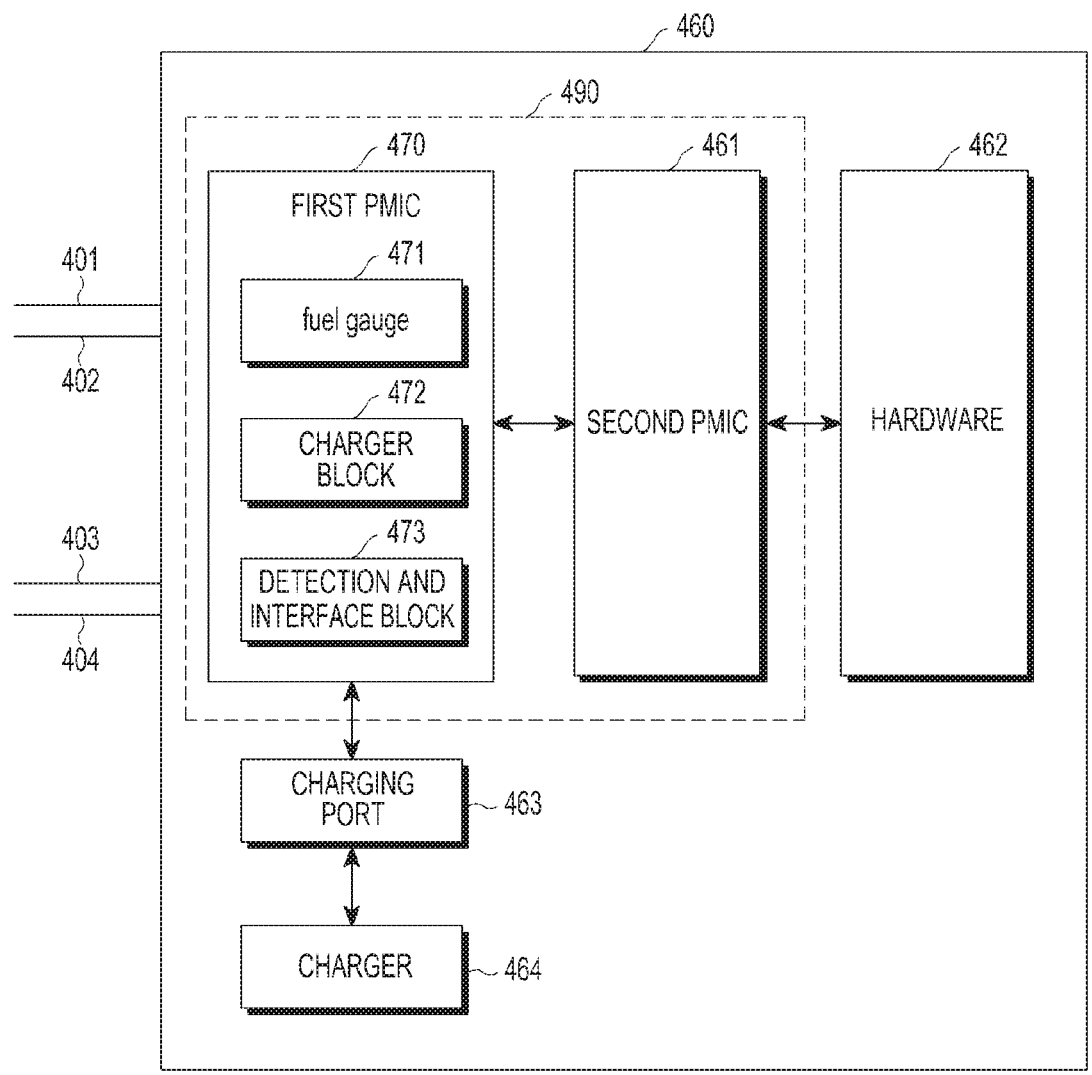
FIG. 4C is a block diagram illustrating an example system, according to various example embodiments of the present disclosure.

FIG. 4C is a block diagram illustrating an example system, according to various example embodiments of the present disclosure.

As illustrated in FIG. 4C, in various embodiments of the present disclosure, paths 401 and 404 for detection may also be connected to the system 460. A fuel gauge 471 of a first PMIC 470 may detect the state of the battery pack 400 using signals from the paths 401 and 404 for detection. The first PMIC 470, for example, may be implemented as an I/F PMIC. Meanwhile, in various embodiments of the present disclosure, a detecting circuit may be included in the system 460 or the first PMIC 470. A charger block 472 may charge the battery cell 410 in the battery pack 400 using power supplied from an external charger 464 through a charging port 463. A detection and interface block 473 may detect a connection of a USB connector, and may receive information provided through the USB connector, or may output information through the USB connector. The second PMIC 461 may distribute the power supplied from the battery pack 400 or an external power source to the hardware 462, and may include wires and passive devices for distribution. The second PMIC 461 may be referred to as a power distribution system in that it can distribute power to the hardware 462. For example, the second PMIC 461 may include an AP PMIC or the like. The second PMIC 461 may be included in the first PMIC 470. Alternatively, the first PMIC 470 and the second PMIC 461 may be configured as a single PMIC 490. The hardware 462 may refer to a variety of hardware included in the electronic device 101, and, for example, may include a processor (e.g., an application processor), a camera, a communication module (an RF module), and a sensor module, which is not limited to any specific type.

Figure 5:
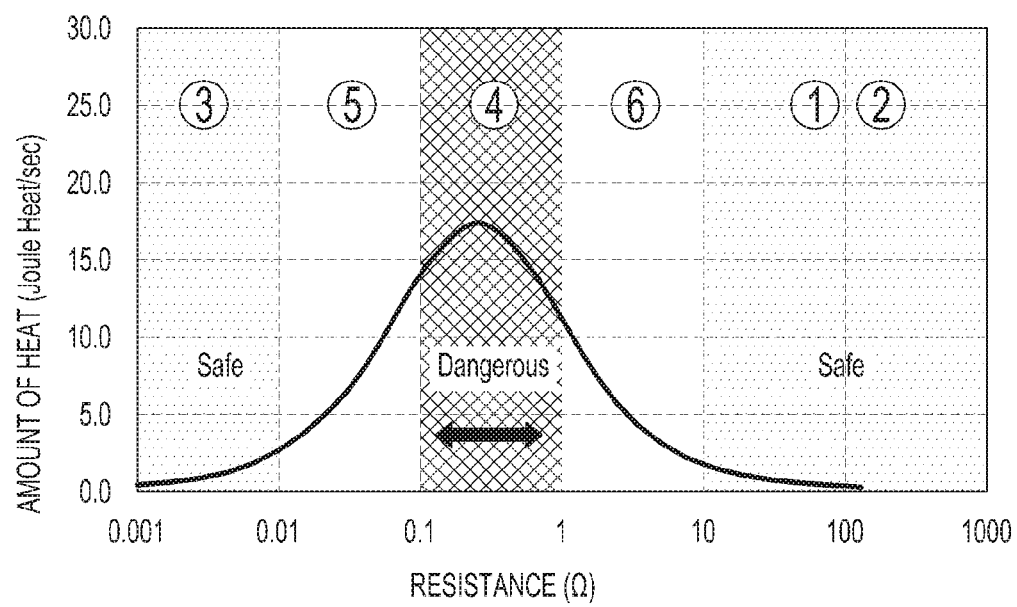
FIG. 5 is a graph illustrating an amount of heat emitting depending on the resistance of an internal short circuit in a battery cell, according to various example embodiments of the present disclosure.

FIG. 5 is a graph illustrating an example of the amount of heat depending on resistance of an internal short circuit in the battery cell, according to various example embodiments of the present disclosure.

As described above, an internal short circuit (ISC) may be formed in the battery cell due to various causes. The amount of heat output from the internal short circuit may be different depending on the resistance, and, for example, a relatively large amount of heat of more than 10 J/second may be released from the internal short circuit in a dangerous range (④) of 0.1 to 1Ω. In this case, the possibility of occurrence of burnout may be relatively high in the battery cell because of heat generation. In the case where the internal short circuit has a resistance in the dangerous range (④), a voltage applied to both ends of the battery cell or the battery pack may be equal to or less than a predetermined threshold value. In the case where the internal short circuit has a resistance in the dangerous range (④), the temperature of the battery cell or the battery pack may be equal to or more than a predetermined threshold value. In the case where the internal short circuit has a resistance in the dangerous range (④), the concentration of a gas generated from the battery cell may be equal to or more than a threshold value. That is, the respective threshold values related to the voltage, the temperature, or the gas concentration may be predetermined as threshold values that are experimentally observed in the dangerous range (④), and information thereof may be stored in the electronic device 101.

Meanwhile, a relatively small amount of heat may be released from the internal short circuit in safe ranges (①, ②, and ③). In addition, although a smaller amount of heat than that of the dangerous range (④) may be released in reserved ranges (⑤ and ⑥), since the reserved ranges (⑤ and ⑥) are likely to proceed to the dangerous range (④), the electronic device 101 may optionally perform a specific operation even in those ranges. The operation in the reserved ranges will be described in greater detail below with reference to FIGS. 8 and 9. Accordingly, the electronic device 101 may pre-store other threshold values associated with various parameters (voltage, temperature, or gas concentration) for distinguishing between the reserved ranges (⑤ and ⑥) and the safe ranges (①, ②, and ③) determined according to experiments. Based at least on the detection result of each parameter, it is possible to detect whether the battery cell is in an abnormal state, a reserved state, or a normal state.

Figure 6:
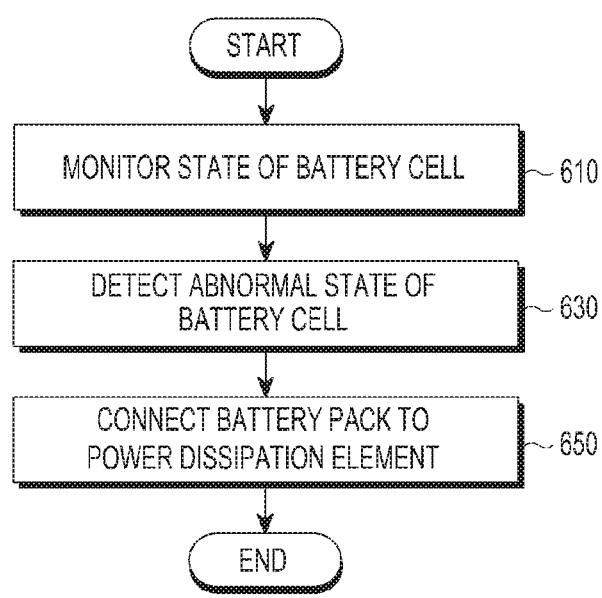
FIG. 6 is a flowchart illustrating an example method of controlling an electronic device, according to various example embodiments of the present disclosure.
Figure 7B:
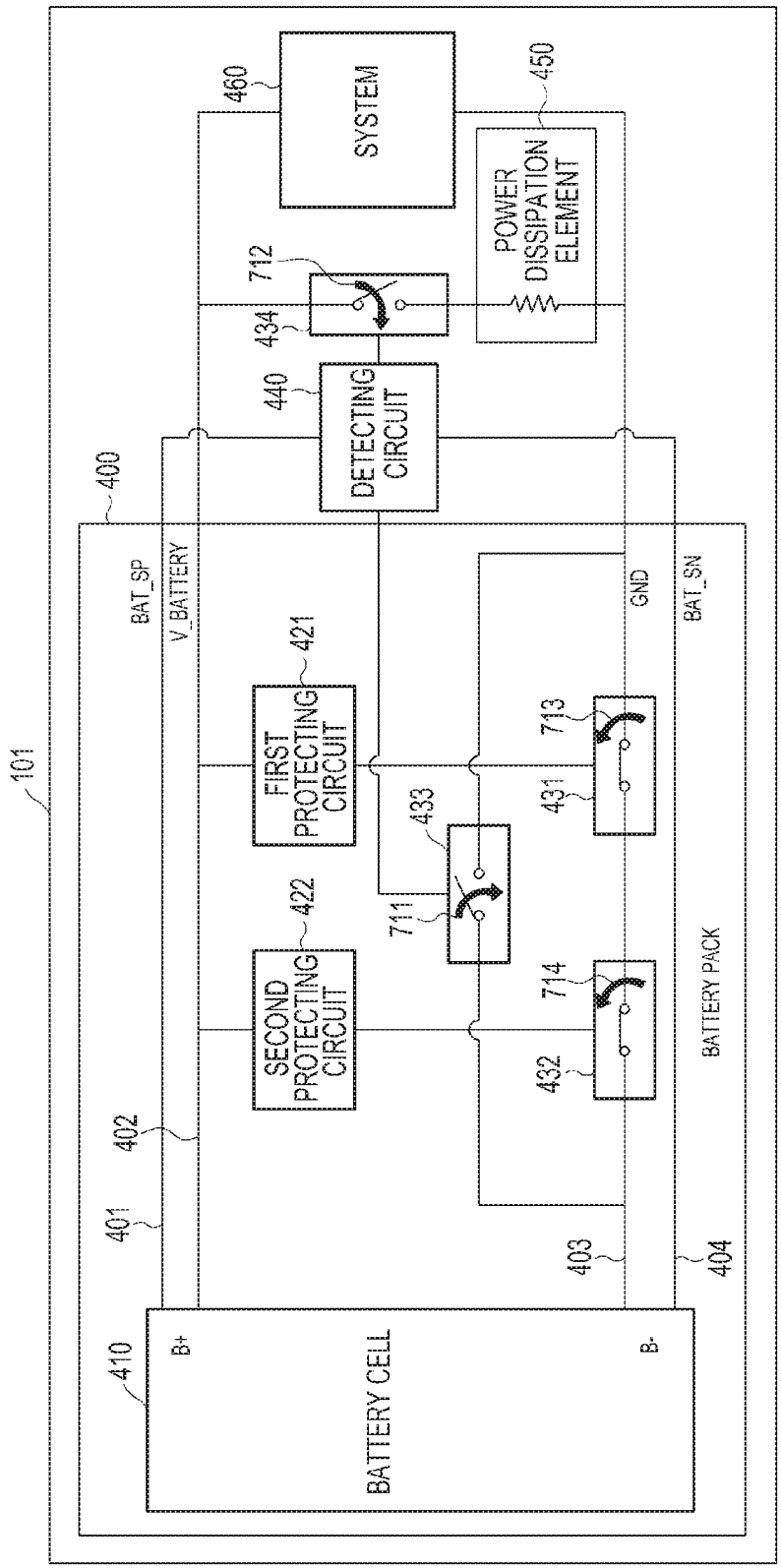
Figure 7C:
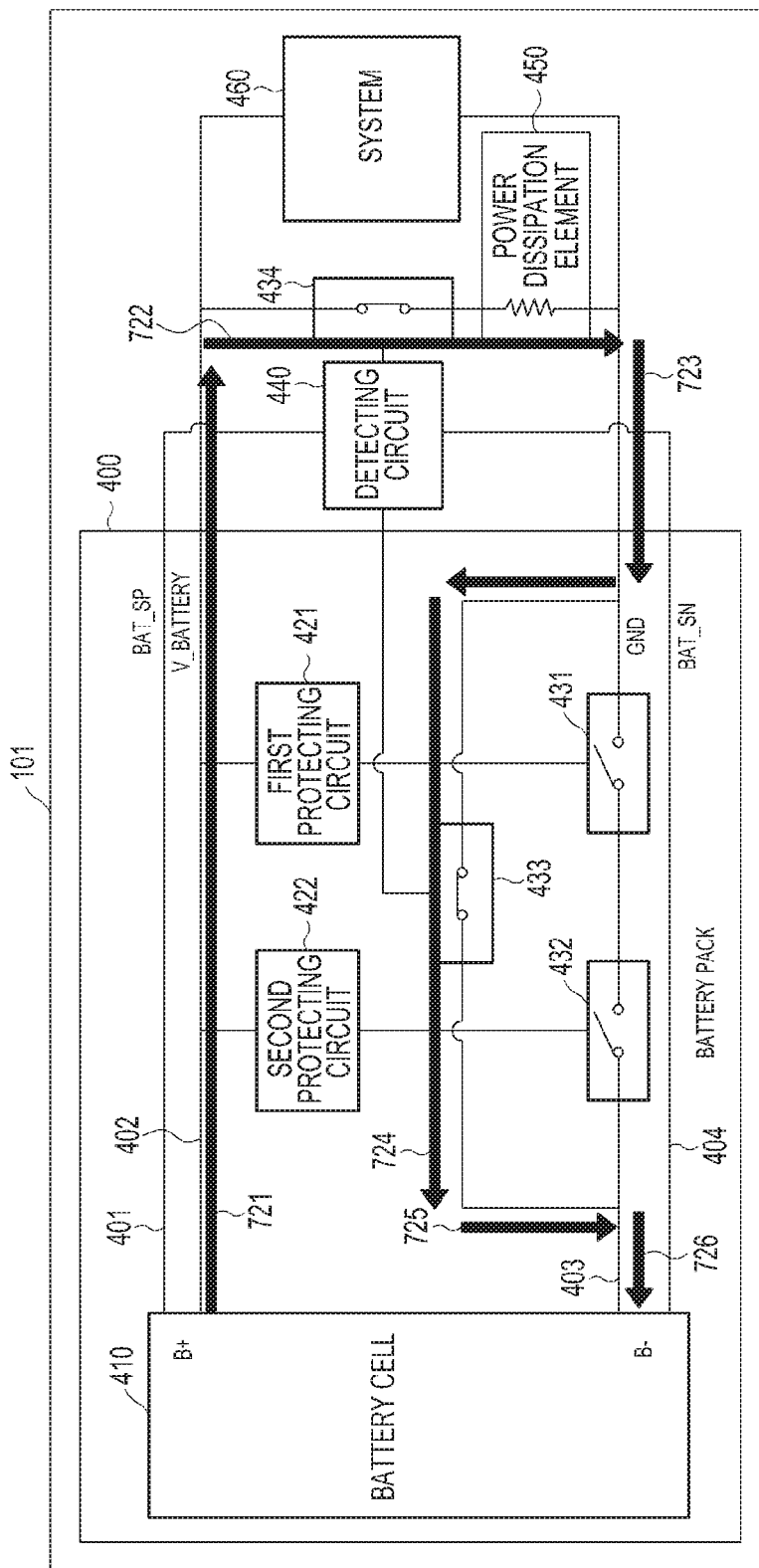

FIG. 6 is a flowchart illustrating an example method of controlling an electronic device, according to various example embodiments of the present disclosure. The embodiment of FIG. 6 will be described in greater detail with reference to FIGS. 7A to 7C. FIGS. 7A, 7B and 7C are diagrams illustrating example switch state control and power supply direction, according to various example embodiments of the present disclosure.

In operation 610, the electronic device 101 may monitor the state of the battery cell 410. For example, according to an embodiment, as described above, the electronic device 101 (e.g., the detecting circuit 440) may periodically or aperiodically monitor a voltage applied to both ends of the battery cell 410. According to an embodiment, the electronic device 101 (e.g., the detecting circuit 440) may periodically or aperiodically monitor various parameters, such as the temperature or the gas concentration, as well as the voltage of the battery cell 410 described above. Meanwhile, the electronic device (e.g., the electronic device 101) may perform a control such that power 701, 702, and 703 may be supplied to the system 460 from the battery pack 400 in a normal state, as illustrated, for example, in FIG. 7A. The electronic device 101 (e.g., the detecting circuit 440) may control the third switch 433 and the fourth switch 434 to be turned off when a voltage applied to both ends of the battery cell 410 exceeds a predetermined threshold value (e.g., 2.5V). In this case, the first switch 431 and the second switch 432 may be controlled to be turned on. As the first switch 431 and the second switch 432 are controlled to be turned on, the power 701, 702, and 703 output from the battery cell 410 may be supplied to the system 460 through the first switch 431 and the second switch 432. In various embodiments of the present disclosure, the first switch 431 and the second switch 432 may be set to the on state by default, and the third switch 433 and the fourth switch 434 may be set to the off state by default. When the battery cell 410 is in a normal state (for example, when a voltage applied to both ends of the battery cell 410 exceeds a predetermined threshold value (e.g., 2.5V)), the detecting circuit 440 may maintain the on states of the first switch 431 and the second switch 432 and the off states of the third switch 433 and the fourth switch 434.

In operation 630, the electronic device 101 may detect an abnormal state of the battery cell. For example, it may be detected whether or not the battery cell 410 enters an abnormal state based at least in part on the detection result of the detecting circuit 440. According to various embodiments, the detecting circuit 440 may detect the abnormal state of the battery cell 410 based at least in part on one of a voltage applied to both ends of the battery cell 410, a temperature of the battery cell 410 or battery pack 400, or a gas concentration thereof. The detecting circuit 440 may detect the abnormal state of the battery cell 410 based on whether or not a value of a corresponding characteristic among the various characteristics including the voltage, temperature, or gas concentration satisfies a specified condition (e.g., a specified value or range) while monitoring the state of the battery cell 410.

In operation 650, when the abnormal state of the battery cell is detected, the electronic device 101 may connect the battery pack 400 to the power dissipation element 450. For example, the electronic device 101 may cut off power supplied from the battery pack 400 to the system 600, and may allow power to be supplied from the battery pack 400 to the power dissipation element 450. Power may be supplied to the system 460 and the power dissipation element 450 from the battery pack 400. That is, the power dissipation element 450 may be electrically connected between the positive electrode and the negative electrode of the battery pack 400. For example, as illustrated in FIG. 7B, the third switch 433 may switch from the off state to the on state (see 711), and the fourth switch 434 may switch from the off state to the on state (see 712). Further, the first switch 431 may switch from the on state to the off state (see 713), and the second switch 432 may switch from the on state to the off state (see 714). For example, the detecting circuit 440 may be electrically connected to the third switch 433 inside the battery pack 400 in order to thereby control the on/off state of the third switch 433. In addition, the on/off states of the FETs (e.g., the switches 433 and 434) may be controlled by switch control signals output from the detecting circuit 440. Accordingly, as illustrated in FIG. 7C, power 721, 722, 723, 724, 725, and 726 may be supplied from the battery pack 400 to the power dissipation element 450. In this case, some other power may be supplied to the system 460 from the battery pack 400. Meanwhile, the electronic device 101, according to various embodiments of the present disclosure, may further include a switch (not shown) for controlling the on or off state of a connection between at least one of the positive electrode or the negative electrode of the battery pack 400 and the system 460. For example, the switch (not shown) may selectively connect the positive electrode (B+) of the battery cell 410 to one end of the system 460, or may selectively connect the negative electrode (B−) of the battery cell 410 to the other end of the system 460. However, the switch (not shown) may be disposed at any position as long as the position is intended for connection or disconnection of the battery cell 410 to or from the system 460. In this case, in the abnormal state, as the switch (not shown) is opened, power may not be supplied to the system 460 from the battery pack 400, and power may be supplied to the power dissipation element 450 from the battery pack 400. Meanwhile, the electronic device 101, according to various embodiments of the present disclosure, may separately include a path from the battery pack 400 to the power dissipation element and a path from the battery pack 400 to the system 460. In this case, the path from the battery pack 400 to the system 460 is used in a normal state so that power may be supplied to the system 460 from the battery pack 400 while the path from the battery pack 400 to the power dissipation element 450 is not used. The path from the battery pack 400 to the power dissipation element 450 is used in an abnormal state while the path from the battery pack 400 to the system 460 is not used, so that power may be supplied to the power dissipation element 450 from the battery pack 400.

Figure 8:
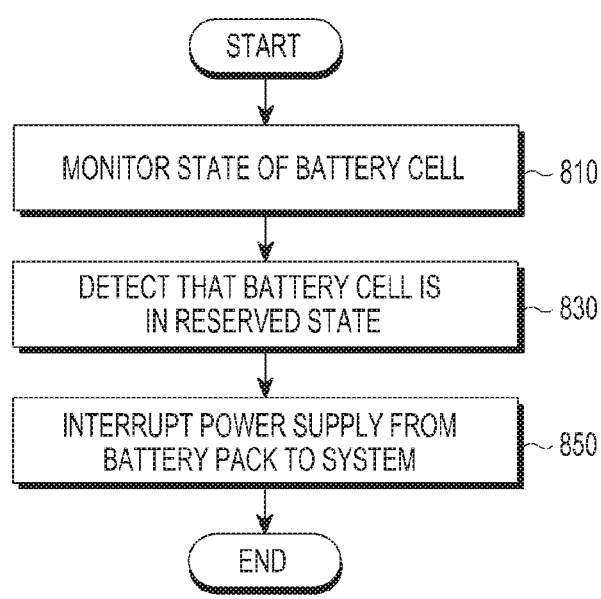
FIG. 8 is a flowchart illustrating an example method of controlling an electronic device, according to various example embodiments of the present disclosure.
Figure 9:
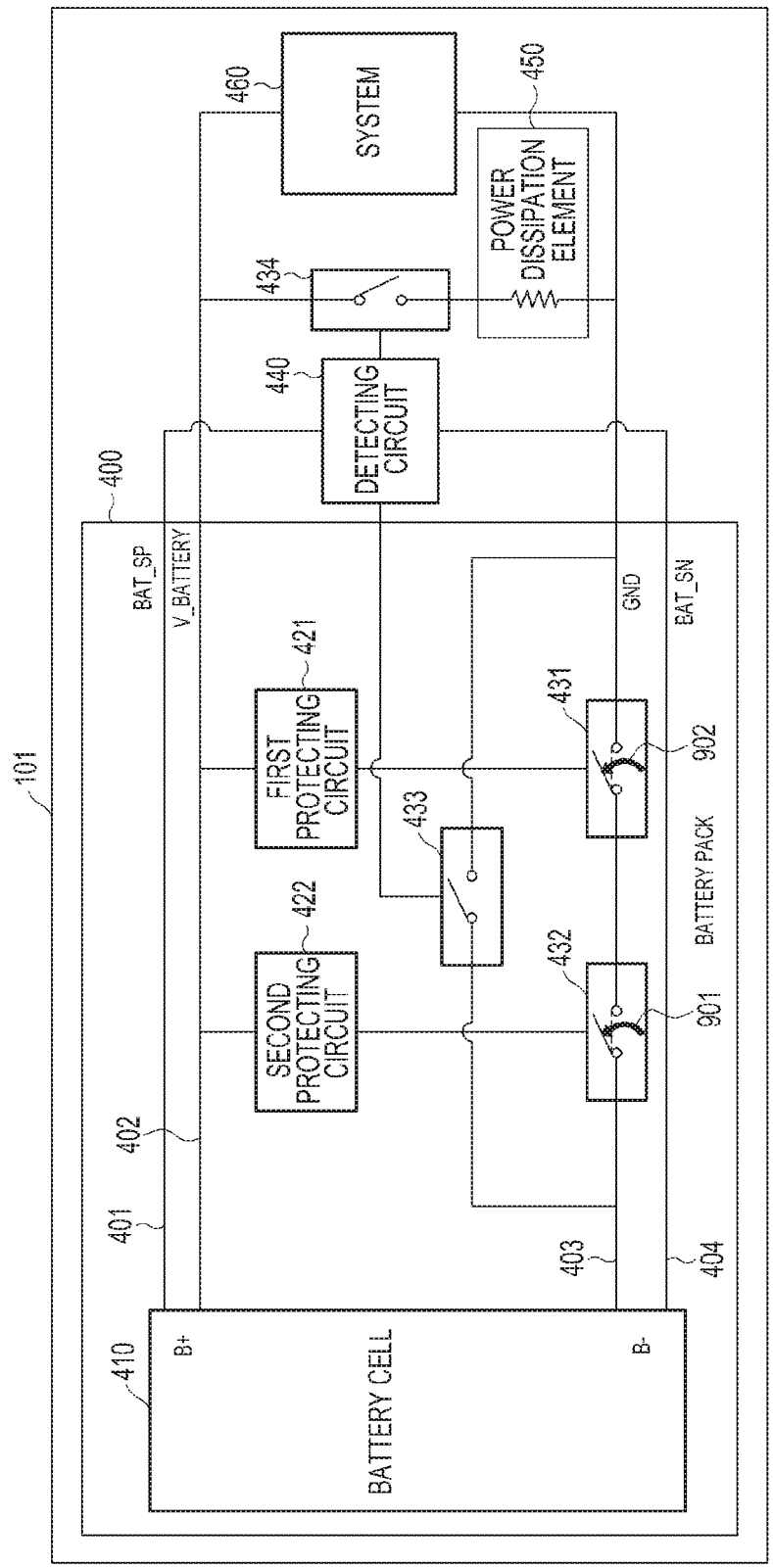
FIG. 9 is a diagram illustrating example switch operation and power supply in a reserved state, according to various example embodiments of the present disclosure.

FIG. 8 is a flowchart illustrating an example method of an electronic device, according to various example embodiments of the present disclosure. The embodiment of FIG. 8 will be described in greater detail with reference to FIG. 9. FIG. 9 is a diagram illustrating example switch operation and power supply in a reserved state, according to various example embodiments of the present disclosure.

In operation 810, the electronic device 101 may monitor the state of the battery cell 410. As described above, the electronic devices 101 (e.g., the detecting circuit 440) may monitor at least one of the parameters including a voltage applied to both ends of the battery pack 400, a temperature near the battery pack 400, or a gas concentration around the battery pack 400. Meanwhile, in a normal state, the electronic device 101 may make a control such that power may be supplied to the system 460 from the battery pack 400.

In operation 830, the electronic device 101 may detect that the battery cell is in a reserved state. According to an embodiment, as described above, the electronic device 101 (e.g., the detecting circuit 440) may detect the state of the battery cell 410 using at least one parameter among, for example, and without limitation, the magnitude of a voltage applied to both ends of the battery pack 400, a temperature of the battery pack 400, or a gas concentration around the battery pack 400. Table 1 is an example showing the states depending on parameter ranges, according to various embodiments of the present disclosure.

TABLE 1

| States | Voltage applied to battery (V) | Battery temperature (° C.) | Gas concentration (ppm) |
|---|---|---|---|
| Normal state | More than 2.5 V | Less than 55° C. | Less than 30 ppm |
| Reserved state | More than 2.3 V and 2.5 V or less | 55° C. or more and less than 65° C. | 30 ppm or more and less than 60 ppm |
| Abnormal state | 2.3 V or less | 65° C. or more | 60 ppm or more |

According to an embodiment, the electronic device 101 may detect the state of the battery pack by sensing a range containing the detected parameters. According to an embodiment, the electronic device 101 may detect the state of the battery pack using one of a plurality of parameters, or may detect the state of the battery pack based at least in part on a combination of the plurality of parameters. In the case where the state of the battery pack is detected based at least in part on a combination of the plurality of parameters, the electronic device 101, for example, may give a weight to each parameter, and may calculate a sum of weights for the detected parameters, thereby detecting the battery state based at least in part on the calculation result. The processor 120 or 210 of the electronic device 101 may detect the state of the battery pack, and may control power supply paths according to the detection result. The detecting circuit 440 may directly convert the on/off state of the switch based on a detected voltage without detecting other parameters.

When the battery pack is detected as being in a reserved state, the power supply from the battery pack 400 to the system 460 may be interrupted in operation 850. For example, as illustrated in FIG. 9, the first switch 431 and the second switch 432 may switch from the on state to the off state in the reserved state (see 901 and 902). Accordingly, power may not be supplied from the battery cell 410 to the system 460. In this case, the power may not be supplied to the power dissipation element 450 from the battery cell 410 as well. For example, the first protecting circuit 421 and the second protecting circuit 422 or the detecting circuit 440 may detect that a condition corresponding to the reserved state is satisfied, and may switch the states of the first switch 431 and the second switch 432 in response thereto.

Meanwhile, the electronic device 101 may detect whether or not the battery cell returns to the normal state. For example, the detecting circuit 440 may detect whether or not a condition corresponding to a normal state is satisfied, and may detect whether or not the battery cell returns back to the normal state based at least in part on whether or not the condition is satisfied. When the battery cell returns back to the normal state, the electronic device 101 may make a control such that power is supplied from the battery pack 400 to the system 460. For example, the electronic device 101 (e.g., the first protecting circuit 421 and the second protecting circuit 422 or the detecting circuit 440) may switch the first switch 431 and the second switch 432 back to the on state, and thus power may be supplied to the system 460, as illustrated in FIG. 7A. When the battery cell 410 enters an abnormal state, the electronic device 101 may make a control such that power is supplied from the battery pack 400 to the power dissipation element 450. For example, the third switch 433 and the fourth switch 434 may switch from the off state to the on state, and accordingly, power 721, 722, 723, 724, 725, and 726 may be supplied from the battery pack 400 to the power dissipation element 450, as illustrated in FIG. 7C. That is, the electronic device 101 (e.g., the detecting circuit 440 or the protecting circuit 480) may preferably perform control to not supply power from the battery pack 400 in the reserved state, and thereafter, when the battery pack enters an abnormal state, the electronic device 101 (e.g., the detecting circuit 440 or the protecting circuit 480) may connect the battery pack 400 to the power dissipation element 450. If the battery cell returns back to the normal state from the reserved state, the electronic device 101 (e.g., the detecting circuit 440 or the protecting circuit 480) may control the battery pack 400 to be connected back to the system 460, so that power may be normally supplied to the system 460 from the battery pack 400.

In an embodiment of the present disclosure, when the voltage applied to both ends the battery cell 410 exceeds, for example, 2.5 V, the third switch 433 and the fourth switch 434 may be turned off while the first switch 431 and the second switch 432 are turned on, so that power may be supplied to the system 460 from the battery cell 410 without being supplied to the power dissipation element 450. Meanwhile, if the voltage applied to both ends of the battery cell 410 is, for example, more than 2.3 V and equal to or less than 2.5 V, the first switch 431, the second switch 432, the third switch 433, and the fourth switch 434 may be turned off, so that power may not be supplied to the system 460 and the power dissipation element 450 from the battery cell 410. Meanwhile, if the voltage applied to both ends of the battery cell 410 is, for example, equal to or less than 2.3 V, the first switch 431 and the second switch 432 may be turned off and the third switch 433 and the fourth switch 434 may be turned on, so that power may be supplied to the power dissipation element 450 from the battery cell 410. Depending on the implementation, power may be supplied to the power dissipation element 450 and the system 460 from the battery cell 410, or power may be supplied only to the power dissipation element 450 from the battery cell 410.

Figure 10:
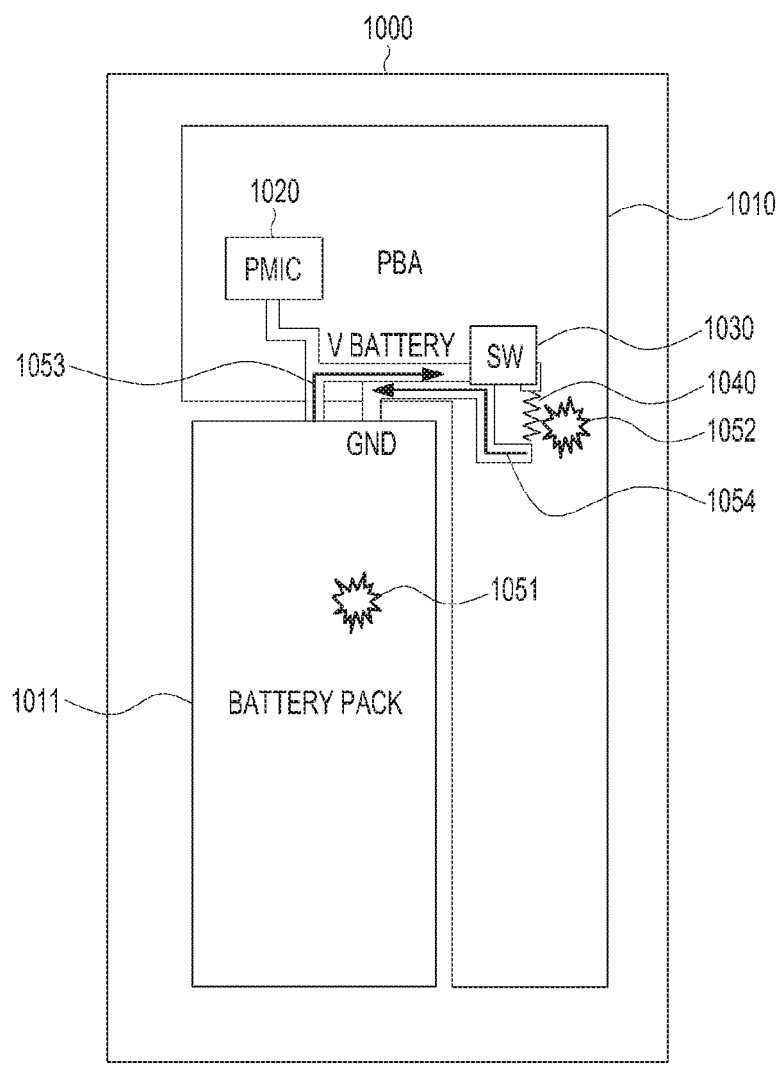
FIG. 10 is a diagram illustrating an example electronic device, according to various example embodiments of the present disclosure.

FIG. 10 is a diagram illustrating an example electronic device, according to various example embodiments of the present disclosure. The electronic device 1000 (e.g., the electronic device 101) may include a battery pack 1011 (e.g., the battery pack 400) and a printed board assembly (PBA) 1010. The PBA 1010 may include a PMIC 1020 (e.g., the system 460), a switch 1030 (e.g., the switch 434), and a power dissipation element 1040 (e.g., the power dissipation element 450), which are disposed thereon. When the battery pack 1011 is detected as being in an abnormal state (see 1051), the electronic device 1000 (e.g., the detecting circuit 440 or the protecting circuit 480) may perform a control such that power is not supplied from the battery pack 1011 to the PMIC 1020 or such that some of the power is supplied to the PMIC 1020, and may control the switch 1030 to supply power from the battery pack 1011 to the power dissipation element 1040. Accordingly, the currents 1053 and 1054 may flow from the battery pack 1011 to the power dissipation element 1040, and heat 1052 may be generated from the power dissipation element 1040.

Figure 11:
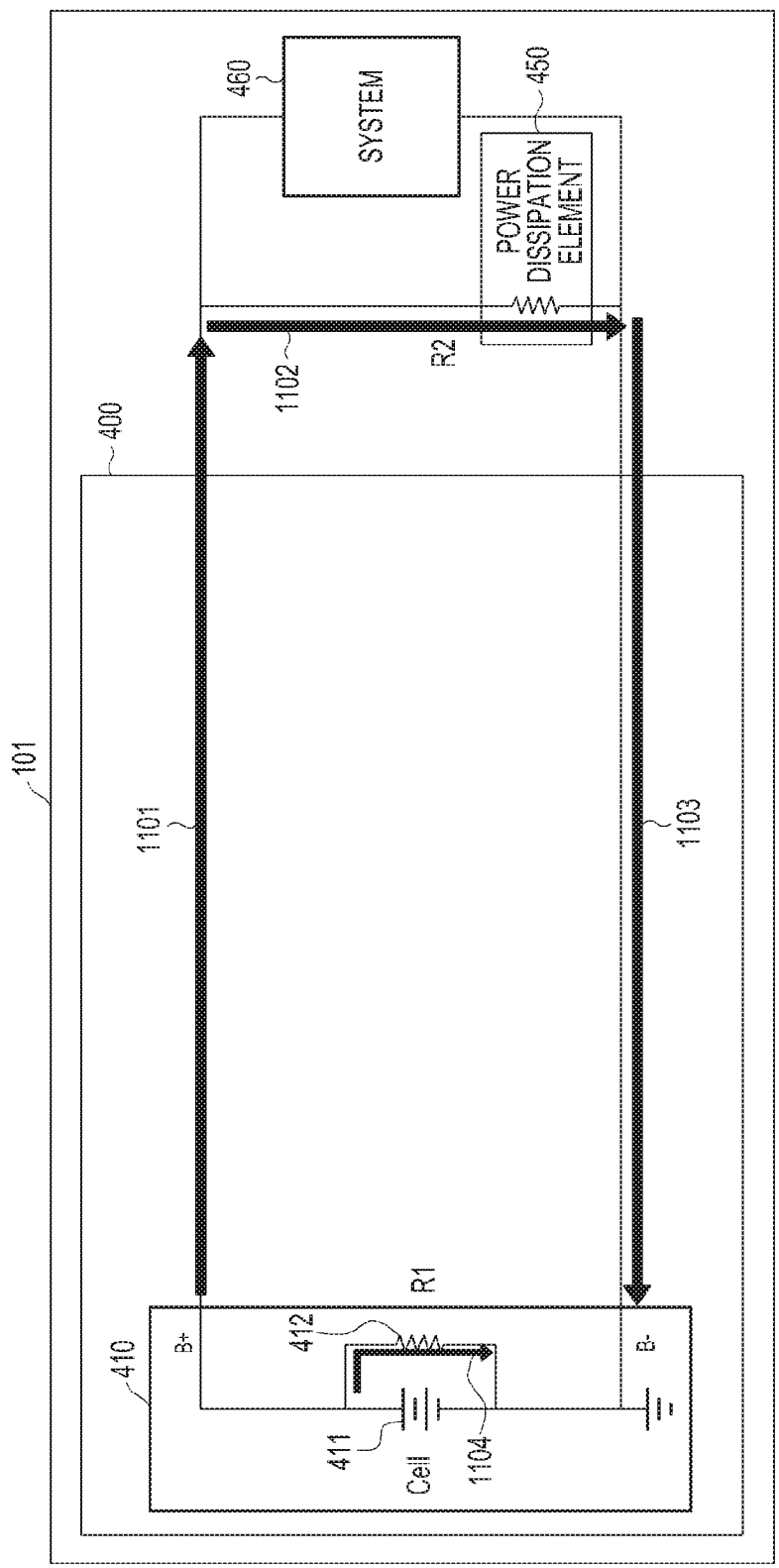
FIG. 11 is a diagram illustrating an example internal short circuit, according to various example embodiments of the present disclosure.

FIG. 11 is a diagram illustrating an example a circuit analysis of an internal short circuit, according to various example embodiments of the present disclosure.

When an internal short circuit occurs inside the battery cell 410, the internal short circuit may be interpreted as a resistor 412 connected in parallel to the battery cell 410. The resistance of the internal short circuit may be $R_1$. Meanwhile, the resistance of the external power dissipation element 450 is given $R_2$. In this case, currents ($I_{R2}$) 1101, 1102, and 1103 flowing through the external power dissipation element 450 may be expressed as Equation 1.

$$I_{R_2} = \frac{V_{cell}}{R_2} \quad \text{[Equation 1]}$$

In Equation 1, $V_{cell}$ may be a voltage applied to both ends of the battery cell. Since the internal short circuit 412 and the external power dissipation element 450 may be interpreted as being connected in parallel, the voltage applied to the power dissipation element 450 may be $V_{cell}$. Power ($P_{loss,R2}$) generated from the external power dissipation element may be expressed as Equation 2.

$$P_{loss,R2} = I_{R2}^2/R_2 \quad \text{[Equation 2]}$$

According to Equations 1 and 2, as the resistance ($R_2$) of the external power dissipation element 450 decreases, compared to the resistance ($R_1$) of the internal short circuit 412 of the battery cell 410, the power ($P_{loss,R2}$) of the external power dissipation element 450 may increase. Accordingly, the resistance ($R_2$) of the external power dissipation element 450 may be set to be smaller than the resistance in the dangerous range of the internal short circuit 450, but the magnitude of the resistance ($R_2$) of the external power dissipation element 450 is not limited. Thus, in the case where the power dissipation element 450 is not disposed, all of the currents 1102 and 1104 flow to the internal short circuit 412 from an electromotive-force generator 411. However, as the power dissipation element 450 is disposed, only some of the current 1104 may flow through the internal short circuit 412, so that heat generated from the battery cell 410 or the battery pack 400 can be reduced.

Figure 12A:
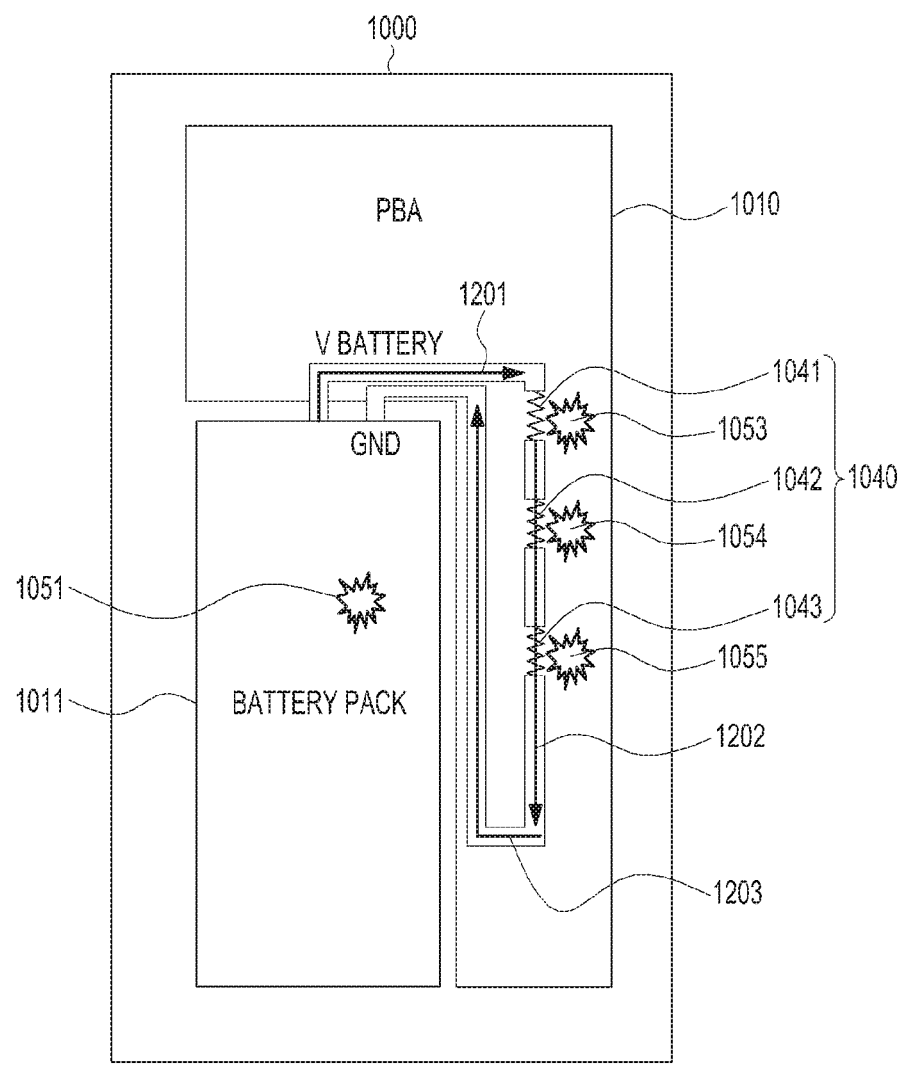
FIGS. 12A and 12B are diagrams illustrating an example power dissipation element, according to various example embodiments of the present disclosure.
Figure 12B:
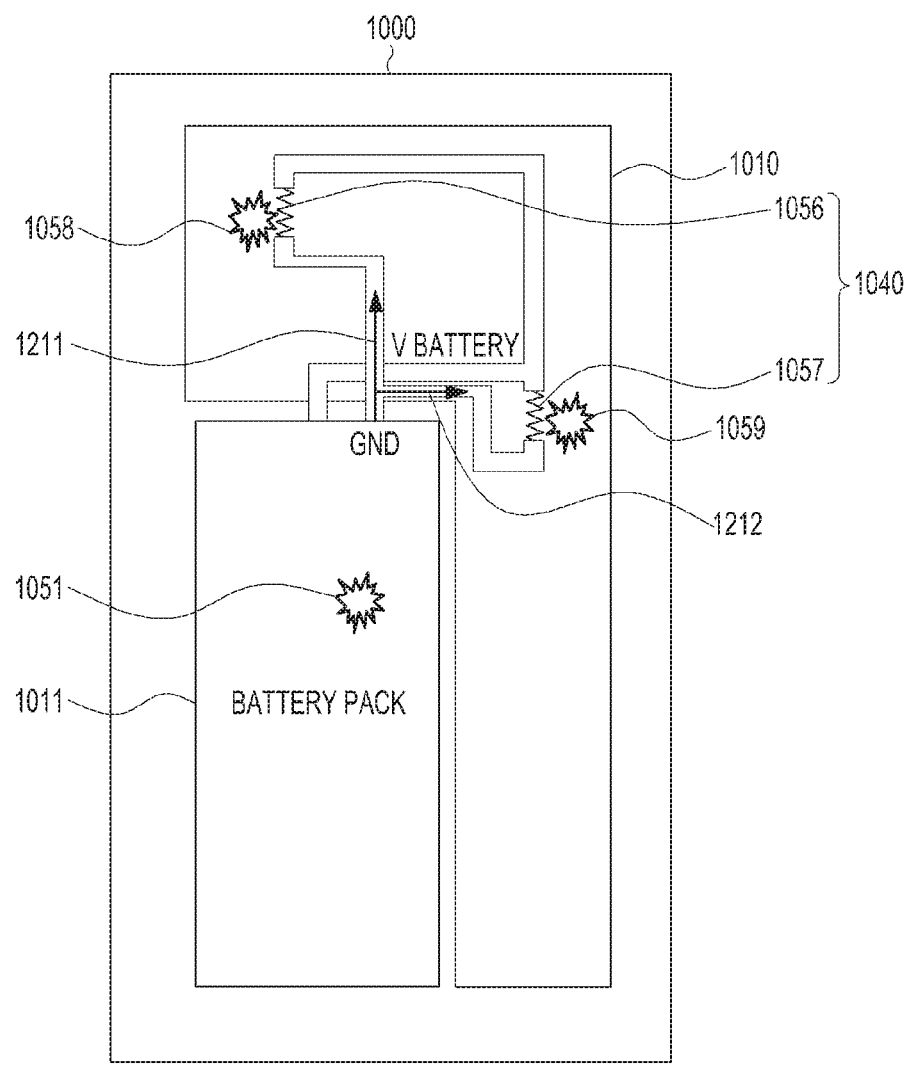

FIGS. 12A and 12B are diagrams illustrating example power dissipation elements, according to various example embodiments of the present disclosure.

Referring to FIG. 12A, the power dissipation element 1040 may, for example, and without limitation, be implemented as a plurality of resistors 1041, 1042, and 1043 connected in series with each other. When an anomaly 1051 occurs in the battery pack 1011, the electronic device 1000 (e.g., the detecting circuit 440 or the protecting circuit 480) may control currents 1201, 1202, and 1203 to flow to the plurality of resistors 1041, 1042, and 1043. Accordingly, heat 1053, 1054, and 1055 may be generated from the plurality of resistors 1041, 1042, and 1043. Referring to FIG. 12B, the power dissipation element 1040 may, for example, and without limitation, be implemented by a plurality of resistors 1056 and 1057 connected in parallel to each other. When an anomaly 1051 occurs in the battery pack 1011, the electronic device 1000 (e.g., the detecting circuit 440 or the protecting circuit 480) may control currents 1211 and 1212 to flow to a plurality of resistors 1056 and 1057. Accordingly, heat 1058 and 1059 may be generated from the plurality of resistors 1056 and 1057. In addition, the electronic device 1000, according to various embodiments of the present disclosure, may include, as a power dissipation element, a combination of resistor devices implemented by both serial connection and parallel connection. Meanwhile, although it is not shown in the drawing, the power dissipation element may, for example, and without limitation, be implemented as a variable resistor. In this case, the resistance of the variable resistor may be determined in response to the parameter detected by the detecting circuit 440.

Figure 13:
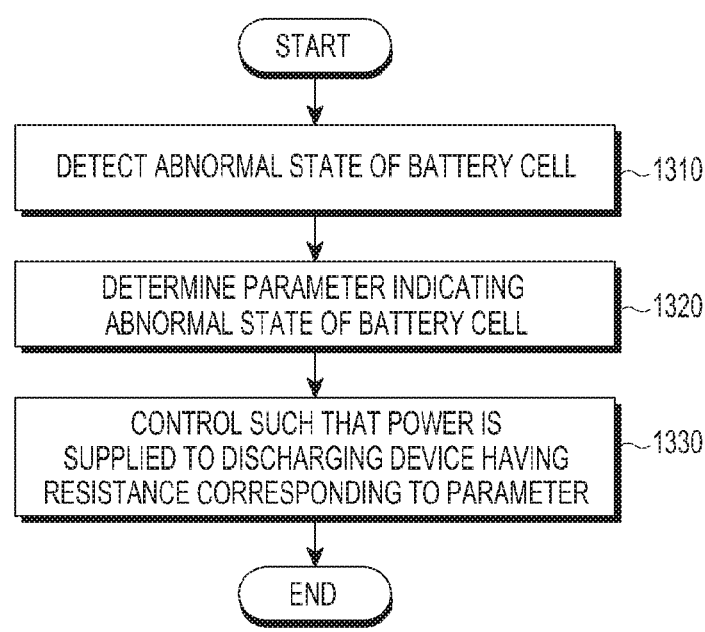
FIG. 13 is a flowchart illustrating an example method of controlling an electronic device, according to various example embodiments of the present disclosure.
Figure 14:
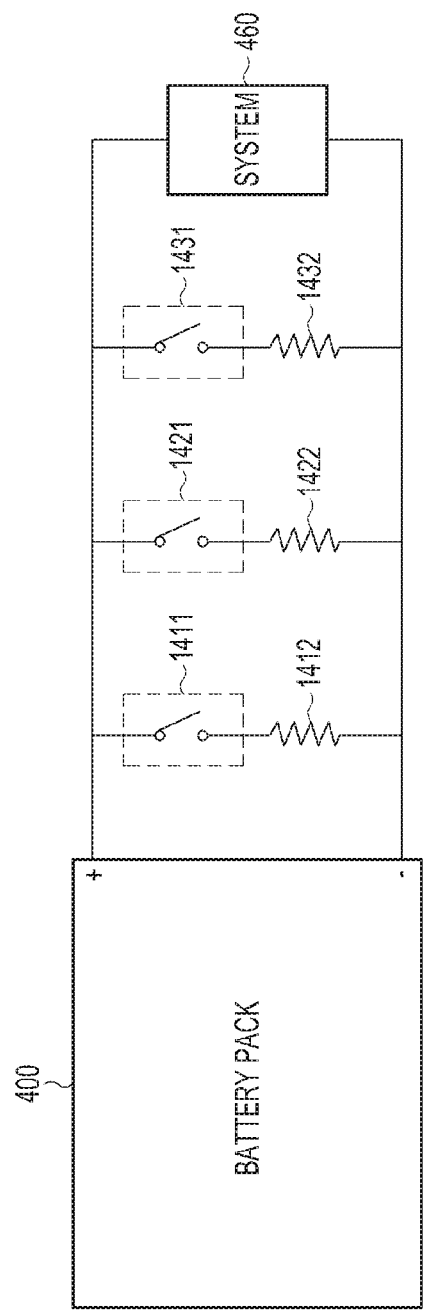
FIG. 14 is a diagram illustrating an example electronic device, according to various example embodiments of the present disclosure.

FIG. 13 is a flowchart illustrating an example method of controlling an electronic device, according to various example embodiments of the present disclosure. The embodiment of FIG. 13 will be described in greater detail with reference to FIG. 14. FIG. 14 is a diagram illustrating an example electronic device, according to various example embodiments of the present disclosure.

In operation 1310, the electronic device 101 (e.g., the detecting circuit 440) may detect an abnormal state of the battery cell. In operation 1320, the electronic device 101 (e.g., the detecting circuit 440) may detect a parameter (e.g., voltage applied to the battery, battery temperature, or gas concentration, etc.) indicating an abnormal state of the battery cell. In operation 1330, the electronic device 101 (e.g., the detecting circuit 440) may perform a control such that power is supplied to a power dissipation element having a resistance corresponding to the parameter. In an embodiment, the electronic device 101 may detect a plurality of parameters, respectively. The electronic device 101, for example, may store a connection-resistance relationship for each parameter as shown in Table 2.

TABLE 2

| Normal or abnormal state by parameters | | Resistor to be connected |
| --- | --- | --- |
| Voltage applied to battery | Abnormal | First resistor |
| Battery temperature | Abnormal | |
| Gas concentration | Abnormal | |
| Voltage applied to battery | Abnormal | Second resistor |
| Battery temperature | Abnormal | |
| Gas concentration | Normal | |
| Voltage applied to battery | Abnormal | Third resistor |
| Battery temperature | Normal | |
| Gas concentration | Normal | |

For example, when the electronic device 101 (e.g., the detecting circuit 440 or the protecting circuit 480) detects that the battery is in an abnormal state based on a voltage applied to the battery, that the battery is in an abnormal state based on a battery temperature, and that the battery is in an abnormal state based on a gas concentration, as illustrated in FIG. 14, the electronic device 101 (e.g., the detecting circuit 440 or the protecting circuit 480) may control the first switch 1411 to be turned on so as to supply power to the first resistor 1412 from the battery pack 400, and may control the second switch 1421 and the third switch 1431 to be turned off. For example, when the electronic device 101 (e.g., the detecting circuit 440 or the protecting circuit 480) detects that: the battery is in an abnormal state based on a voltage applied to the battery; the battery is in an abnormal state based on a battery temperature; and the battery is in a normal state based on a gas concentration, as illustrated in FIG. 14, the electronic device 101 (e.g., the detecting circuit 440 or the protecting circuit 480) may control the second switch 1421 to be turned on so as to supply power to the second resistor 1422 from the battery pack 400, and may control the first switch 1411 and the third switch 1431 to be turned off. For example, when the electronic device 101 (e.g., the detecting circuit 440 or the protecting circuit 480) detects that the battery is in an abnormal state based on a voltage applied to the battery, that the battery is in a normal state based on a battery temperature, and that the battery is in a normal state based on a gas concentration, as illustrated in FIG. 14, the electronic device 101 (e.g., the detecting circuit 440 or the protecting circuit 480) may control the third switch 1431 to be turned on so as to supply power to the third resistor 1432 from the battery pack 400, and may control the first switch 1411 and the second switch 1421 to be turned off. The first resistor 1412 to the third resistor 1432 may, for example, and without limitation, be implemented as resistance devices connected in parallel to each other. The first resistor 1412 to the third resistor 1432 may be implemented as a variety of hardware in the electronic device 101, respectively. For example, and without limitation the first resistor 1412 may be a heat pipe; the second resistor 1422 may be a camera module; and the third resistor may be a touch screen panel.

Figure 15:
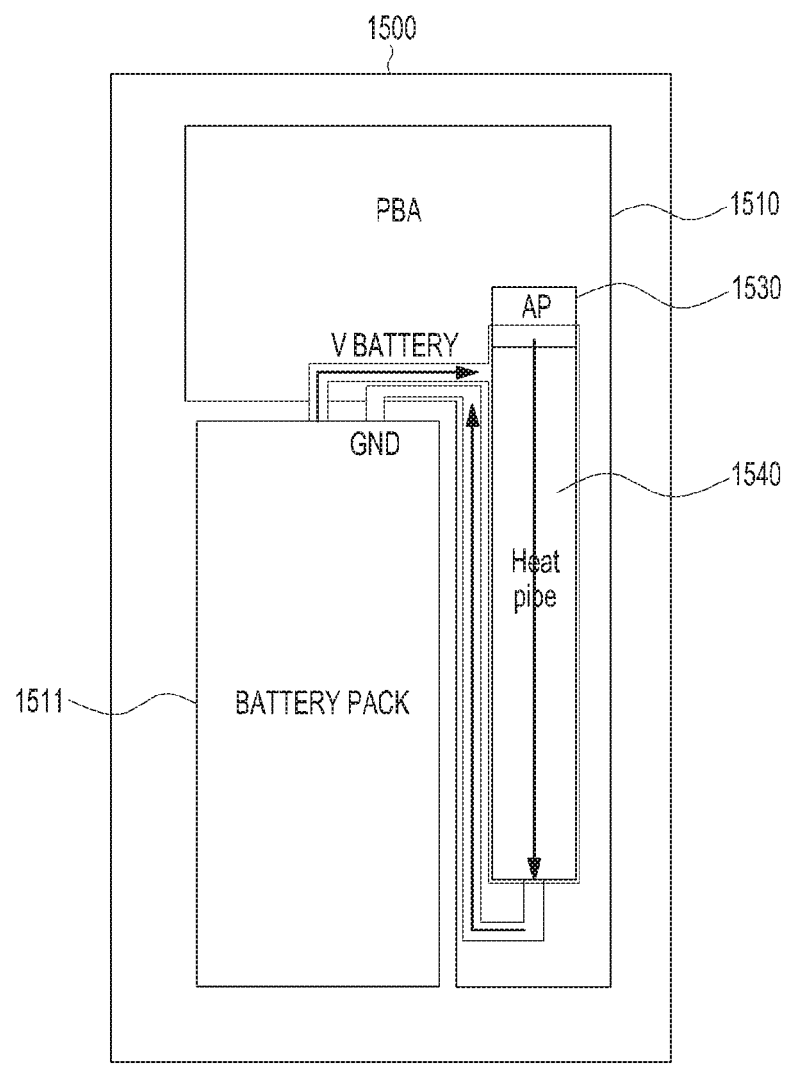
FIGS. 15 and 16 are diagrams illustrating an example power dissipation element implemented in the form of a heat pipe, according to various example embodiments of the present disclosure.
Figure 16:
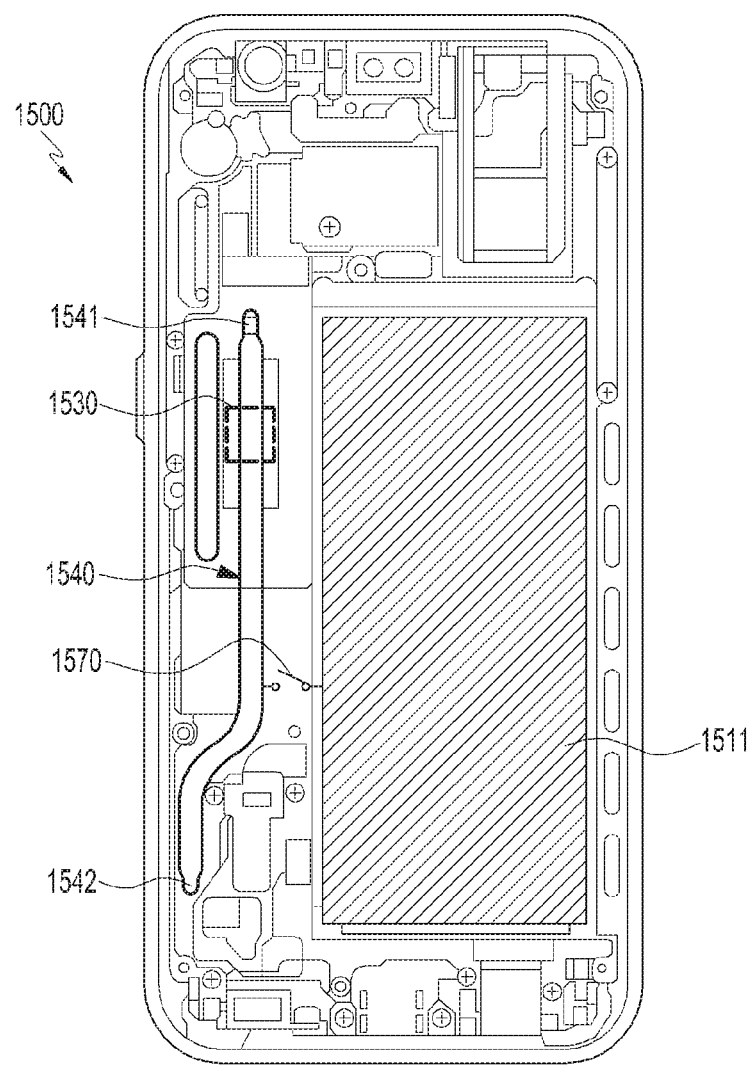

FIGS. 15 and 16 are diagrams illustrating an example power dissipation element implemented in the form of a heat pipe, according to various example embodiments of the present disclosure.

Referring to FIGS. 15 and 16, a heat pipe 1540 for releasing heat of an AP 1530 (e.g., the processor 120 or 210) may be connected onto a PBA 1510 (e.g., the PBA 1010) of an electronic device 1500 (e.g., the electronic device 101 or 1000). One end 1541 of the heat pipe 1540 may be disposed close to the AP 1530, which is a high-temperature heat source, and the other end 1542 thereof may be disposed in a low-temperature region away from the heat source. Meanwhile, a battery pack 1511 (e.g., the battery pack 400 or 1011) may be connected to the heat pipe 1540. The heat pipe 1540 may comprise, for example, a conductive material, and may have a resistance lower than the resistance in the dangerous range of the internal short circuit of the battery cell. Accordingly, the heat pipe 1540 may be supplied with power from the battery pack 1511. A switch 1570 (e.g., the switch 434 or 1030) may be disposed between the battery pack 1511 and the heat pipe 1540. When the battery pack 1511 or the internal battery cell is detected as being in an abnormal state, the switch 1570 may be controlled to be turned on. When the switch 1570 is controlled to be turned on, the heat pipe 1540 may be supplied with power from the battery pack 1511 in order to thereby emit heat, so that the energy may be dispersed from the battery pack 1511. As described above, since the electronic device 101 can use hardware that has been conventionally required and adopted as a power dissipation element without adding separate hardware for the power dissipation element, allocation of an additional mounting area thereof can be prevented.

Figure 17:
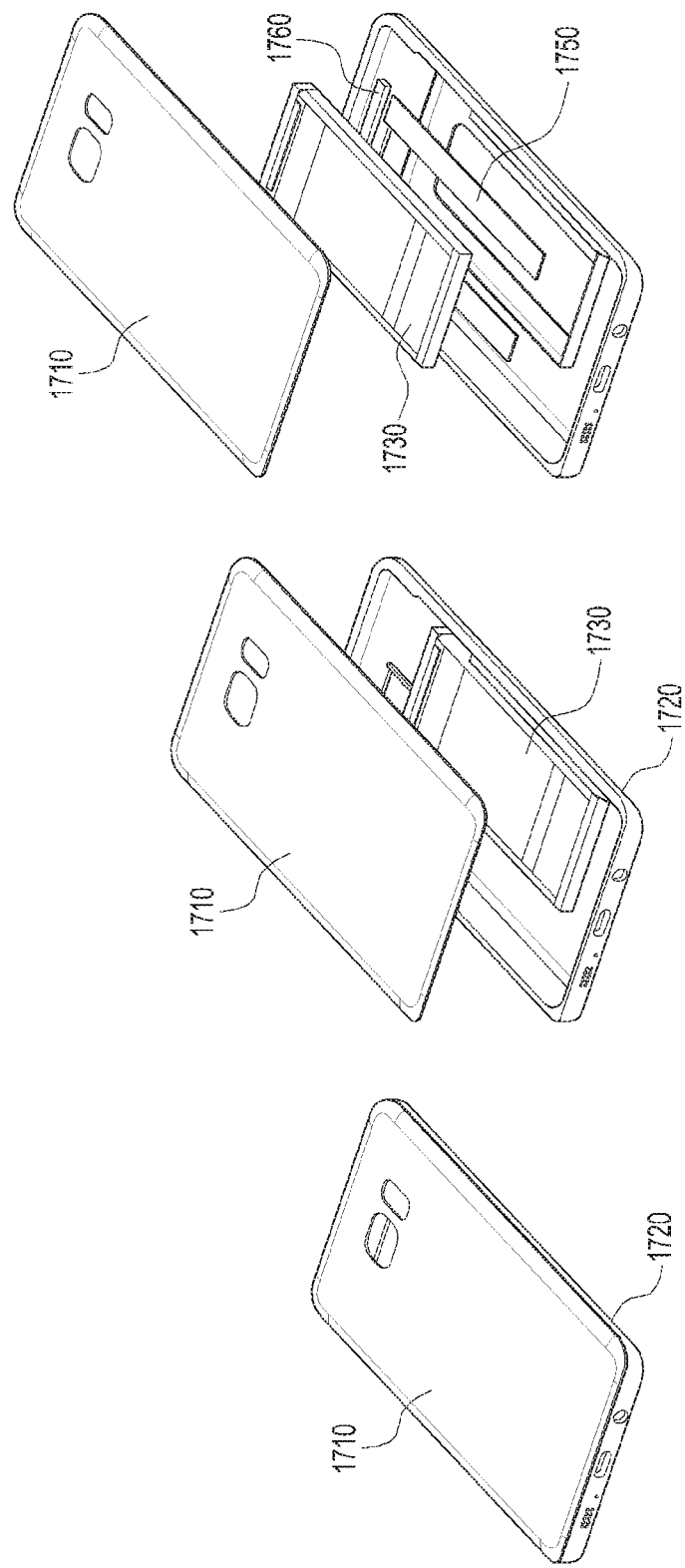
FIG. 17 is a diagram illustrating an example electronic device equipped with a battery, according to various example embodiments of the present disclosure.

FIG. 17 is a diagram illustrating an example electronic device equipped with a battery, according to various example embodiments of the present disclosure.

As illustrated in FIG. 17, the electronic device may enclose internal hardware by means of a rear case 1710 and a front case 1720. A battery 1730 (e.g., the battery pack 400, 1011, or 1511) may be disposed on a substrate, and may be enclosed from the outside by the rear case 1710. Meanwhile, a battery mounting tape 1750 for mounting the battery 1730 and a level compensation member 1760 for compensating for a level difference caused by the battery 1730 may be disposed between the battery 1730 and the front case 1720.

Figure 18A:
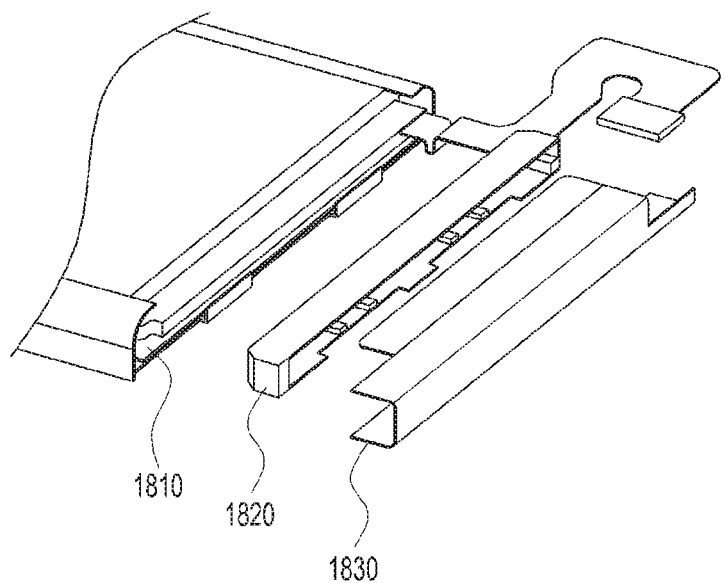
FIGS. 18A and 18B are diagrams illustrating an example structure of a battery pack, according to various example embodiments of the present disclosure.
Figure 18B:
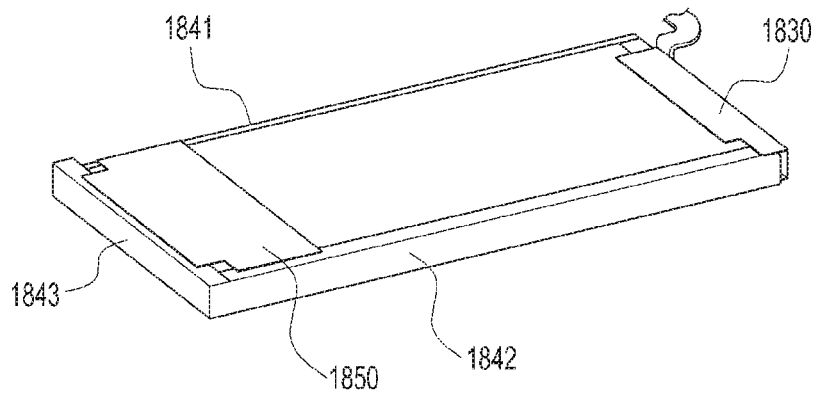

FIGS. 18A and 18B are diagrams illustrating an example structure of a battery pack, according to various example embodiments of the present disclosure.

Referring to FIGS. 18A and 18B, the battery pack may include a protection circuit module (PCM) 1810, which is a printed board assembly (PBA) on which a protecting circuit for a cell is mounted. The battery pack may include a plastic case 1820 for protecting the battery cell from movement of the PCM 1810 by an external force. Damage due to an external force, such as a dent in the battery cell, may be prevented and/or reduced by the plastic case 1820. In addition, the battery pack may include an upper tape 1830 for fixing the PCM 1810 and the battery cell and for preventing and/or reducing exposure of the external terminals. The battery pack may include side tapes 1841, 1842 and 1843 for fixing an aluminum pouch folding member of the battery cell and for preventing exposure thereof to the outside. The battery pack may include a level compensation tape 1850 for compensating for a level difference caused by the battery cell.

Figure 19A:
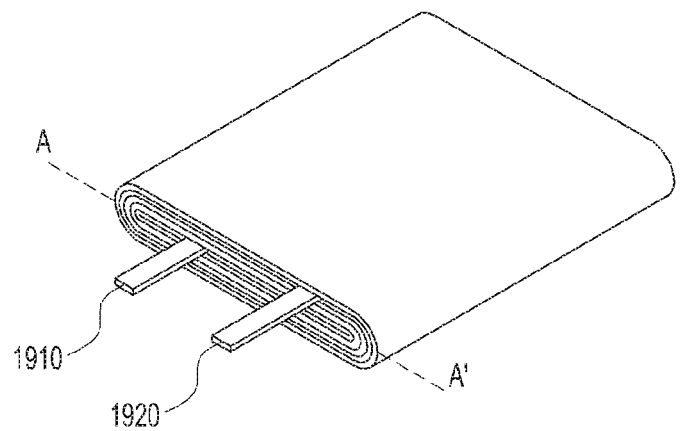
FIGS. 19A and 19B are diagrams illustrating an example battery cell, according to various example embodiments of the present disclosure.
Figure 19B:
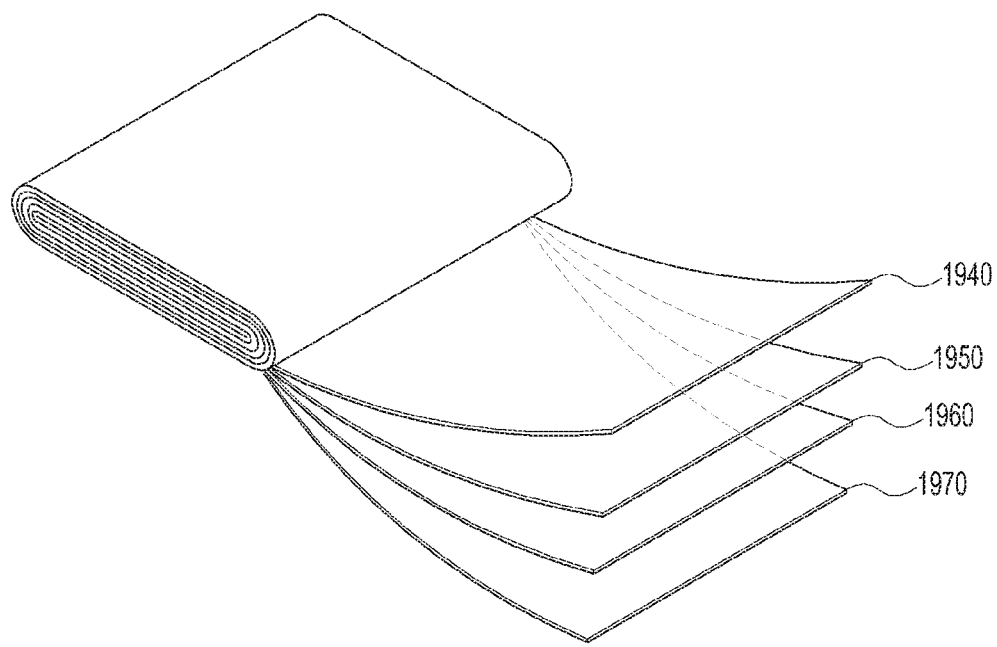

FIGS. 19A and 19B are diagrams illustrating an example battery cell, according to various example embodiments of the present disclosure.

Referring to FIG. 19A, the battery cell may include a positive electrode tab 1910 and a negative electrode tab 1920. The positive electrode tab 1910, for example, may be connected with the path 402 for power supply to be connected to the positive electrode and with the path 401 for detection to be connected to the positive electrode in FIG. 4B. The negative electrode tab 1920, for example, may be connected with the path 403 for power supply to be connected to the negative electrode and with the path 404 for detection to be connected to the negative electrode in FIG. 4B. Referring to FIG. 19B, the battery cell may include a positive electrode substrate 1940, a separator 1950, a negative electrode substrate 1960, and a separator 1970. The positive electrode tab 1910 may be a path that is connected to the positive electrode substrate 1940 for the movement of electrons to the outside. The negative electrode tab 1920 may be a path that is connected to the negative electrode substrate 1960 for the movement of electrons to the outside. The positive electrode substrate 1940 may be an electrode in which a reduction reaction occurs during the discharge of the battery, and, for example, may include a positive active material of $LiCoO_2$ and a positive collector plate of an aluminum foil. The separators 1950 and 1970 may be substrates for preventing an electrical short between the positive electrode and the negative electrode. The negative electrode substrate 1960 may be an electrode in which an oxidation reaction occurs during the discharge of the battery, and, for example, may include a negative active material of graphite and a negative collector plate of a copper foil.

Various example embodiments disclosed herein are provided merely to describe technical details of the present disclosure and to aid in the understanding of the present disclosure, and are not intended to limit the scope of the present disclosure. Therefore, it should be understood that all modifications and changes or modified and changed forms based on the technical idea of the present disclosure fall within the scope of the present disclosure as defined by the appended claims and their equivalents.

What is claimed is:

1. A portable communication device comprising:
a battery pack for supplying power to a system to be powered;
a power dissipation element disposed outside the battery pack;
a detecting circuit configured to detect a state of the battery pack; and
at least one first switch electrically connected to the battery pack and the detecting circuit, wherein the detecting circuit is configured to control the at least one first switch to:
electrically disconnect the power dissipation element from the battery pack based on the state of the battery pack not satisfying a specified condition, wherein the specified condition indicates an abnormal state of the battery pack; and
electrically connect the power dissipation element to the battery pack for supplying at least part of the power to the power dissipation element, based on the state of the battery pack satisfying the specified condition.

2. The portable communication device of claim 1, further comprising a power management integrated circuit (PMIC) connected to the battery pack and configured to manage power of the battery pack, wherein
the power management integrated circuit (PMIC) is part of the system to be powered and is configured to be electrically connected to the battery pack based on the state of the battery pack not satisfying the specified condition.

3. The portable communication device of claim 2, further comprising at least one second switch disposed inside the battery pack and configured to selectively connect the battery pack and the power management integrated circuit with each other.

4. The portable communication device of claim 3, further comprising at least one third switch connected in parallel to at least one second switch inside the battery pack,
wherein the at least one third switch is configured to connect the battery pack to the power dissipation element based on the state of the battery pack satisfying the specified condition.

5. The portable communication device of claim 3, further comprising at least one protecting circuit connected to at least one second switch inside the battery pack,
wherein the at least one protecting circuit is configured to control the at least one second switch to not supply power to the power management integrated circuit based on the state of the battery pack satisfying another specified condition.

6. The portable communication device of claim 1, wherein the detecting circuit is configured to detect at least one of: a voltage applied between a positive electrode and a negative electrode of the battery pack, a temperature of the battery pack, or a gas concentration around the battery pack, and
wherein, the detecting circuit is configured to control the at least one first switch to be turned on to supply power to the power dissipation element from the battery pack based on at least one of: the voltage, the temperature, or the gas concentration, falling within a specified range.

7. The portable communication device of claim 6, wherein the detecting circuit comprises one or more sensors configured to detect values corresponding to the voltage, the temperature, and/or the gas concentration.

8. The portable communication device of claim 1, wherein the power dissipation element comprises a plurality of resistors connected in series or parallel to each other.

9. The portable communication device of claim 8, wherein, some of the plurality of resistors are connected to the battery pack when the power dissipation element is configured as a plurality of resistors connected in parallel.

10. An electronic device system comprising:
a battery pack;
a power management integrated circuit (PMIC) configured to supply power output from the battery pack to an electronic device to be powered;
a power dissipation element disposed outside the battery pack; and
a protecting circuit configured to control the power output from the battery pack, wherein the protecting circuit is configured to:
detect a state of the battery pack;
electrically disconnect the battery pack from the power dissipation element and electrically connect the battery pack to the power management integrated circuit based on the state not satisfying a specified condition, wherein the specified condition indicates an abnormal state of the battery pack; and
electrically connect the battery pack to the power dissipation element and electrically disconnect the battery pack from the power management integrated circuit for supplying at least part of the power to the power dissipation element, based on the state satisfying the specified condition.

11. The electronic device system of claim 10, wherein at least a part of the protecting circuit is disposed outside the battery pack.

12. The electronic device system of claim 10, wherein the protecting circuit comprises one or more switches configured to operate to electrically connect/disconnect the battery pack to/from the power dissipation element or the power management integrated circuit.

13. The electronic device system of claim 12, wherein the one or more switches comprise a first switch configured to operate to supply the power to the power management integrated circuit and a second switch configured to operate to not supply the power to the power dissipation element based on the state not satisfying the specified condition.

14. The electronic device system of claim 13, wherein the first switch is configured to operate to not supply the power to the power management integrated circuit and the second switch is configured to operate to supply the power to the power dissipation element based on the state satisfying the specified condition.

15. The electronic device system of claim 13, wherein at least a part of the first switch is disposed inside the battery pack.

16. The electronic device system of claim 13, further comprising a third switch connected in parallel to the first switch, wherein the third switch is configured to operate to supply the at least part of the power to the power dissipation element while bypassing the first switch when the state satisfies the specified condition.

17. The electronic device system of claim 10, wherein the protecting circuit is configured to detect at least one of: a voltage applied between a positive electrode and a negative electrode of the battery pack, a temperature of the battery pack, or a gas concentration around the battery pack, and
wherein the protecting circuit is electrically connected such that the power output from the battery pack is supplied to the power dissipation element based on at least one of the voltage, the temperature, or the gas concentration falling within a specified range.

18. The electronic device system of claim 10, wherein the power dissipation element comprises a plurality of resistors connected in parallel to each other, and
wherein the protecting circuit is configured to connect some of the plurality of resistors to the battery pack based on the state satisfying the specified condition.

19. A battery pack comprising:
a housing;
a battery cell for supplying power to a power management integrated circuit, disposed inside the housing;
one or more switches disposed inside the housing; and
a detecting circuit configured to detect a state of the battery cell,
wherein the detecting circuit is configured to control the one or more switches to:
electrically connect the battery cell to the power management integrated circuit disposed outside the battery pack and electrically disconnect the battery cell from power dissipation circuitry disposed outside the battery pack based on the state of the battery cell not satisfying a specified condition, wherein the specified condition indicates an abnormal state of the battery cell; and
electrically disconnect the battery cell from the power management integrated circuit and electrically connect the battery cell to the power dissipation circuitry for supplying at least part of the power to power dissipation circuitry based on the state of the battery cell satisfies satisfying the specified condition.

20. The battery pack of claim 19, wherein the detecting circuit is further configured to:
detect the state of the battery cell; and
provide a signal corresponding to the detected state to the one or more switches.

* * * * *